(12) United States Patent
Hashizume

(10) Patent No.: US 11,572,502 B2
(45) Date of Patent: Feb. 7, 2023

(54) WAVELENGTH CONVERSION ELEMENT, LIGHT SOURCE DEVICE, PROJECTOR, AND METHOD OF MANUFACTURING WAVELENGTH CONVERSION ELEMENT

(71) Applicant: SEIKO EPSON CORPORATION, Tokyo (JP)

(72) Inventor: Toshiaki Hashizume, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 505 days.

(21) Appl. No.: 16/821,236

(22) Filed: Mar. 17, 2020

(65) Prior Publication Data

US 2020/0299574 A1  Sep. 24, 2020

(30) Foreign Application Priority Data

Mar. 18, 2019 (JP) .............................. JP2019-050089

(51) Int. Cl.
*C09K 11/02* (2006.01)
*G03B 21/20* (2006.01)
*C09K 11/08* (2006.01)

(52) U.S. Cl.
CPC .......... *C09K 11/02* (2013.01); *C09K 11/0838* (2013.01); *G03B 21/204* (2013.01)

(58) Field of Classification Search
CPC ..................................................... C09K 11/02
See application file for complete search history.

(56) References Cited

U.S. PATENT DOCUMENTS

| | | | |
|---|---|---|---|
| 2013/0056725 A1 | 3/2013 | Eberhardt et al. |
| 2015/0276177 A1 | 10/2015 | Maeda et al. |
| 2018/0180975 A1 | 6/2018 | Furuyama et al. |

FOREIGN PATENT DOCUMENTS

| | | | |
|---|---|---|---|
| JP | 2013-520824 A | 6/2013 |
| JP | 2015-197474 A | 11/2015 |
| JP | 2017-058654 A | 3/2017 |

*Primary Examiner* — Vip Patel
(74) *Attorney, Agent, or Firm* — Dority & Manning, P.A.

(57) ABSTRACT

A wavelength conversion element includes a phosphor layer having phosphor particles and a binder, and a holding member including alumina, configured to hold the layer. The binder includes glass and is configured to bind a part the adjacent particles. The holding member has a pore, defining an apparent porosity thereof as X, bending strength A of the holding member fulfills $A=-7.11X+316.52$, an elastic modulus B of the holding member fulfills $B=-6.26X+288.43$, and defining an elastic modulus of the glass as C, $1/B+1/C=D$, and a product of a difference between a linear expansion coefficient of the holding member and a linear expansion coefficient of the glass and a transition point of the glass as Y, $Y<(A)(D)(0.001)$ when the linear expansion coefficient of the glass is smaller than the linear expansion coefficient of the holding member in a temperature range from the transition point of the glass to a room temperature.

14 Claims, 24 Drawing Sheets

WAVELENGTH CONVERSION ELEMENT, LIGHT SOURCE DEVICE, PROJECTOR, AND METHOD OF MANUFACTURING WAVELENGTH CONVERSION ELEMENT

The present application is based on, and claims priority from JP Application Serial Number 2019-050089, filed Mar. 18, 2019, the disclosure of which is hereby incorporated by reference herein in its entirety.

BACKGROUND

1. Technical Field

The present disclosure relates to a wavelength conversion element, a light source device, a projector, and a method of manufacturing a wavelength conversion element.

2. Related Art

In the past, there has been known a wavelength conversion element which is excited by excitation light entering the wavelength conversion element to emit fluorescence having longer wavelength than the wavelength of the excitation light. As such a wavelength conversion element, there has been known a light emitting element provided with a base member, a reflecting layer formed on a surface of the base member, and a phosphor layer formed on the reflecting layer (see, e.g., JP-A-2015-197474 (Document 1)).

In the light emitting element described in Document 1, the phosphor layer has a plurality of phosphor particles and a binder for binding the plurality of phosphor particles to each other.

The binder includes a cross-linked body made of an inorganic material such as liquid glass. The binder binds a phosphor particle to another phosphor particle adjacent to each other, and at the same time, binds the phosphor particles and the surface of the reflecting layer with each other. The phosphor particles are each a phosphor shaped like a particle which absorbs the excitation light emitted from the outside to emit the fluorescence. The phosphor particles include a phosphor material such as a YAG series material. Further, in Document 1, there is shown an example in which a light source device having the light emitting element described above is applied to a projector.

In the phosphor layer described in Document 1, the plurality of phosphor particles is encapsulated in the binder. In other words, the binder exists around the phosphor particles so as to cover the entire surface of each of the phosphor particles. Therefore, the fluorescence emitted from the phosphor particles enters the inside of the binder, propagates in the binder, and is then emitted from the phosphor layer. The fluorescence emitted from the phosphor layer is emitted from the light source device, and then enters a reflective liquid crystal panel constituting an optical system.

However, when the fluorescence propagates inside the binder in the phosphor layer, an exit area of the fluorescence in the surface of the phosphor layer becomes larger than the incident area of the excitation light. Further, when the exit area of the fluorescence is large, there is a possibility that the incident efficiency of the fluorescence to the liquid crystal panel decreases in the optical system. In other words, when the entire surface of the phosphor particle is covered with the binder, there is a possibility that the use efficiency of the fluorescence in the optical system which the fluorescence enters from the phosphor layer decreases.

On the other hand, it is conceivable to adopt an alumina substrate as the base member on which the phosphor layer is disposed. Among such alumina substrates, the alumina substrate including pores has a high reflection property, and can therefore effectively reflect the fluorescence entering the alumina substrate from the phosphor layer to thereby prevent an amount of light emitted from the wavelength conversion element from decreasing.

However, when forming the phosphor layer on the alumina substrate, since the linear expansion coefficient of the binder and the linear expansion coefficient of the alumina are different from each other, there is a possibility that the alumina substrate is damaged by a stress applied to the alumina substrate.

SUMMARY

A wavelength conversion element according to a first aspect of the present disclosure includes a phosphor layer having a plurality of phosphor particles and a binder configured to bind one of the phosphor particles adjacent to each other and another of the phosphor particles adjacent to each other out of the plurality of phosphor particles, and a holding member including alumina and configured to hold the phosphor layer, wherein the binder includes glass, the binder binds a part of a surface of the one of the phosphor particles and a part of a surface of the another of the phosphor particles to each other, the holding member is provided with a pore, defining an apparent porosity of the holding member as X expressed in terms of %, defining bending strength of the holding member as A expressed in terms of MPa, A fulfills a formula (1) below, defining an elastic modulus of the holding member as B expressed in terms of GPa, B fulfills a formula (2) below, and defining an elastic modulus of the glass as C expressed in terms of GPa, defining a sum of a reciprocal of B and a reciprocal of C as D, defining a product of a difference between a linear expansion coefficient of the holding member and a linear expansion coefficient of the glass and a transition point of the glass as Y, a value of Y is smaller than a value of a product of A, D, and 0.001 when the linear expansion coefficient of the glass is smaller than the linear expansion coefficient of the holding member in a temperature range from the transition point of the glass to a room temperature.

$$A = -7.11X + 316.52 \tag{1}$$

$$B = -6.26X + 288.43 \tag{2}$$

In the first aspect described above, a proportion of a volume of the binder to a total volume of a sum of volumes of the phosphor particles and a sum of volumes of the binder may be larger than 0 vol % and no larger than 10 vol %.

A light source device according to a second aspect of the present disclosure includes any one of the wavelength conversion elements described above, and a light source configured to emit excitation light to the wavelength conversion element.

A method of manufacturing a wavelength conversion element according to a third aspect of the present disclosure includes a preparation step of preparing a mixture obtained by mixing phosphor particles and a binder including glass with each other, a coating step of applying the mixture on a holding member including alumina, and a calcination step of calcining the mixture, wherein a calcination temperature in the calcination step is 100° C. or more higher than a softening point of the glass, the holding member is provided with a pore, defining an apparent porosity of the holding member as X expressed in terms of %, defining bending strength of the holding member as A expressed in terms of MPa, A fulfills a formula (3) below, defining an elastic modulus of the holding member as B expressed in terms of GPa, B fulfills a formula (4) below, and defining an elastic modulus of the glass as C expressed in terms of GPa, defining a sum of a reciprocal of B and a reciprocal of C as D, defining a product of a difference between a linear expansion coefficient of the holding member and a linear expansion coefficient of the glass and a transition point of the glass as Y, a value of Y is smaller than a value of a product of A, D, and 0.001 when the linear expansion coefficient of the glass is smaller than the linear expansion coefficient of the holding member in a temperature range from the transition point of the glass to a room temperature.

$$A=-7.11X+316.52 \quad (3)$$

$$B=-6.26X+288.43 \quad (4)$$

A method of manufacturing a wavelength conversion element according to a fourth aspect of the present disclosure includes a preparation step of preparing a mixture obtained by mixing phosphor particles and a binder including glass with each other, a coating step of applying the mixture on a holding member including alumina, and a calcination step of calcining the mixture, wherein viscosity of the glass in the calcination step is no higher than $10^6$ dPa·s, the holding member is provided with a pore, defining an apparent porosity of the holding member as X expressed in terms of %, defining bending strength of the holding member as A expressed in terms of MPa, A fulfills a formula (5) below, defining an elastic modulus of the holding member as B expressed in terms of GPa, B fulfills a formula (6) below, and defining an elastic modulus of the glass as C expressed in terms of GPa, defining a sum of a reciprocal of B and a reciprocal of C as D, defining a product of a difference between a linear expansion coefficient of the holding member and a linear expansion coefficient of the glass and a transition point of the glass as Y, a value of Y is smaller than a value of a product of A, D, and 0.001 when the linear expansion coefficient of the glass is smaller than the linear expansion coefficient of the holding member in a temperature range from the transition point of the glass to a room temperature.

$$A=-7.11X+316.52 \quad (5)$$

$$B=-6.26X+288.43 \quad (6)$$

A wavelength conversion element according to a fifth aspect of the present disclosure is manufactured by any of the methods of manufacturing the wavelength conversion element described above.

A light source device according to a sixth aspect of the present disclosure includes any one of the wavelength conversion elements described above, and a light source configured to emit excitation light to the wavelength conversion element.

A projector according to a seventh aspect of the present disclosure includes the light source device described above, a light modulation device configured to modulate light emitted from the light source device in accordance with image information, and a projection optical device configured to project the light modulated by the light modulation device.

DESCRIPTION OF AN EXEMPLARY EMBODIMENT

An embodiment of the present disclosure will hereinafter be described based on the drawings.

Schematic Configuration of Projector

Figure 1:
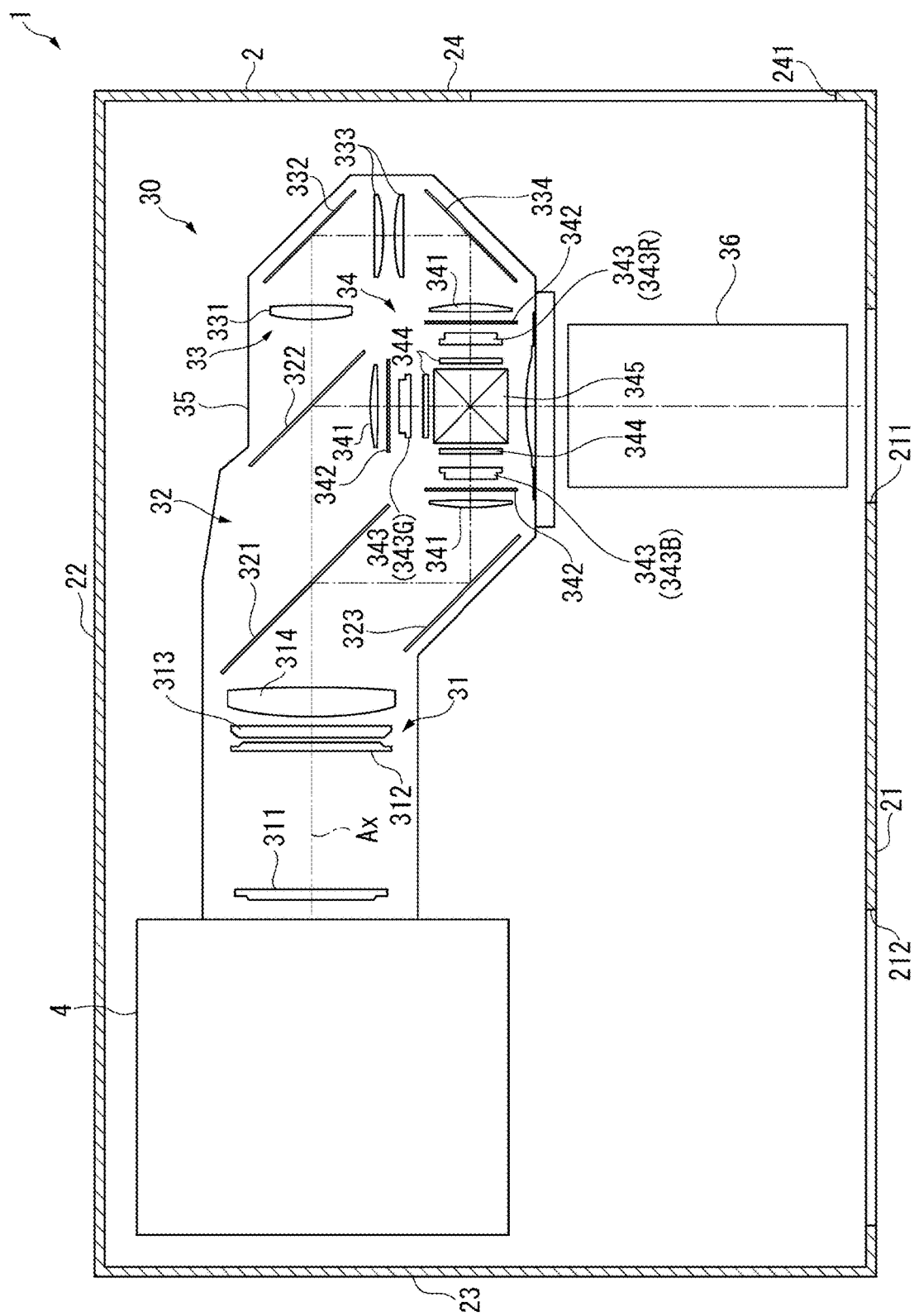
FIG. 1 is a schematic diagram showing a configuration of a projector in an embodiment.

FIG. 1 is a schematic diagram showing a configuration of a projector 1 according to the present embodiment.

The projector 1 according to the present embodiment modulates the light emitted from a light source device 4 described later to project image light for forming an image corresponding to image information on a projection target surface such as a screen in an enlarged manner. As shown in FIG. 1, the projector 1 is provided with an exterior housing 2 forming an exterior, and the light source device 4 and an optical device 30 disposed inside the exterior housing 2. It should be noted that a configuration of the light source device 4 and the optical device 30 will be described later in detail. Besides the above, although not shown in the drawing, the projector 1 is provided with a control device for controlling an operation of the projector 1, a power supply device for supplying electronic components with electrical power, and a cooling device for cooling a cooling target.

Configuration of Exterior Housing

The exterior housing 2 has a top surface part and a bottom surface part each not shown, a front surface part 21, a back surface part 22, a left side surface part 23, and a right side surface part 24, and is formed to have a substantially rectangular solid shape.

The front surface part 21 has an opening part 211 for exposing a part of a projection optical device 36 described later, and the image light to be projected by the projection optical device 36 passes through the opening part 211. Further, the front surface part 21 has an exhaust port 212 from which a cooling gas having cooled the cooling target in the projector 1 is discharged to the outside of the exterior housing 2. Further, the right side surface part 24 has an introduction port 241 from which a gas located outside the exterior housing 2 is introduced inside as the cooling gas.

Configuration of Optical Device

The optical device 30 is provided with a homogenizing device 31, a color separation device 32, a relay device 33, an image forming device 34, an optical component housing 35, and the projection optical device 36.

The homogenizing device 31 homogenizes the light emitted from the light source device 4. The light thus homogenized by the homogenizing device 31 illuminates modulation areas of light modulation devices 343 described later of the image forming device 34 via the color separation device 32 and the relay device 33. The homogenizing device 31 is provided with two lens arrays 311, 312, a polarization conversion element 313, and a superimposing lens 314.

The color separation device 32 separates the light having entered the color separation device 32 from the homogenizing device 31 into colored light beams of red, green, and blue. The color separation device 32 is provided with two dichroic mirrors 321, 322 and a reflecting mirror 323 for reflecting the blue light beam having been separated by the dichroic mirror 321.

The relay device 33 is disposed on a light path of the red light beam longer than a light path of the blue light beam and a light path of the green light beam to suppress a loss of the red light beam. The relay device 33 is provided with an incident side lens 331, relay lenses 333, and reflecting mirrors 332, 334.

It should be noted that although the relay device 33 is disposed in the light path of the red light beam, this is not a limitation, and it is also possible to adopt a configuration in which, for example, the colored light beam longer in light path than other colored light beams is set to the blue light beam, and the relay device 33 is disposed on the light path of the blue light beam.

The image forming device 34 modulates each of the colored light beams of red, green, and blue having entered the image forming device 34, and combines the colored light beams thus modulated with each other to form the image light to be projected by the projection optical device 36. The image forming device 34 is provided with three field lenses 341, three incident side polarization plates 342, three light modulation devices 343, and three exit side polarization plates 344 each disposed in accordance with the respective colored light beams entering the image forming device 34, and a single color combining device 345.

The light modulation devices 343 each modulate the light emitted from the light source device 4 in accordance with the image information. The light modulation devices 343 include the light modulation device 343R for modulating the red light beam, the light modulation device 343G for modulating the green light beam, and the light modulation device 343B for modulating the blue light beam. In the present embodiment, the light modulation devices 343 are each formed of a transmissive liquid crystal panel, and the incident side polarization plate 342, the light modulation device 343, and the exit side polarization plate 344 constitute a liquid crystal light valve.

The color combining device 345 combines the colored light beams respectively modulated by the light modulation devices 343B, 343G, and 343R with each other to form the image light described above. In the present embodiment, the color combining device 345 is formed of a cross dichroic prism, but this is not a limitation, and it is also possible for the color combining device 346 to be constituted by, for example, a plurality of dichroic mirrors.

The optical component housing 35 houses the homogenizing device 31, the color separation device 32, the relay device 33, and the image forming device 34 each described above inside. It should be noted that an illumination light axis Ax as a design optical axis is set in the optical device 30, and the optical component housing 35 holds the homogenizing device 31, the color separation device 32, the relay device 33, and the image forming device 34 at predetermined positions on the illumination light axis Ax. The light source device and the projection optical device 36 are disposed at predetermined positions on the illumination light axis Ax.

The projection optical device 36 projects the image light entering the projection optical device 36 from the image forming device 34 on the projection target surface in an enlarged manner. In other words, the projection optical device 36 projects the light beams having respectively been modulated by the light modulation devices 343B, 343G, and 343R. The projection optical device 36 is configured as a combination lens having, for example, a plurality of lenses housed in a lens tube having a cylindrical shape.

Configuration of Light Source Device

Figure 2:
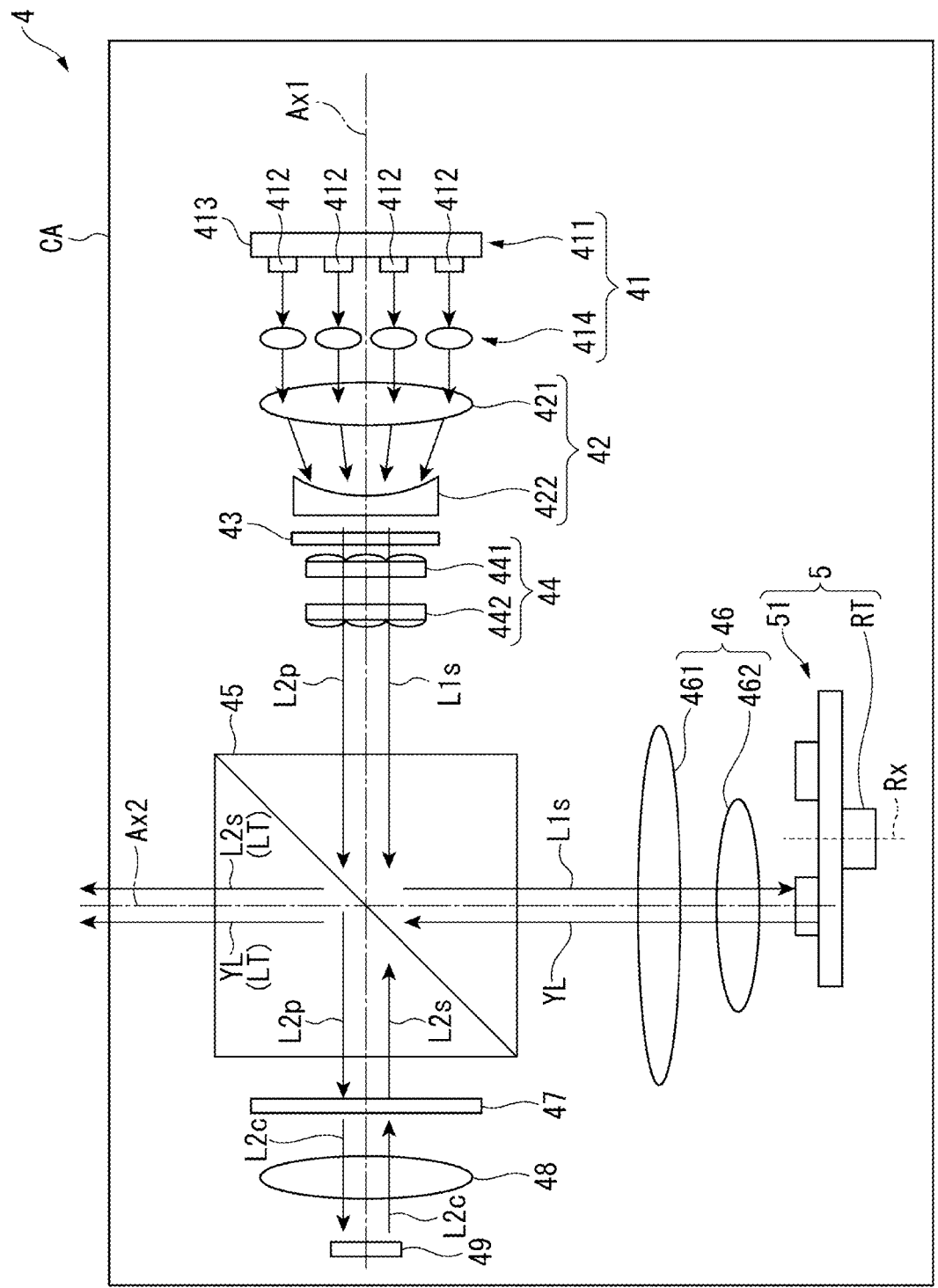
FIG. 2 is a schematic diagram showing a configuration of a light source device in the embodiment.

FIG. 2 is a schematic diagram showing a configuration of the light source device 4.

The light source device 4 emits illumination light LT for illuminating the light modulation devices 343 to the homogenizing device 31. As shown in FIG. 2, the light source device 4 is provided with a light source housing CA, and a light source section 41, an afocal optical element 42, a first retardation element 43, a homogenizer optical element 44, a polarization split element 45, a first light collection element 46, a second retardation element 47, a second light collection element 48, a diffusely reflecting device 49, and a wavelength conversion device 5 each housed in the light source housing CA.

The light source housing CA is a sealed housing difficult for dust or the like to enter the inside thereof.

The light source section 41, the afocal optical element 42, the first retardation element 43, the homogenizer optical element 44, the polarization split element 45, the second retardation element 47, the second light collection element 48, and the diffusely reflecting device 49 are arranged on an illumination light axis Ax1 set in the light source device 4.

The wavelength conversion device 5, the first light collection element 46, and the polarization split element 45 are arranged on an illumination light axis Ax2 which is set in the light source device 4, and is perpendicular to the illumination light axis Ax1. The illumination light axis Ax2 coincides with the illumination light axis Ax at the position of the lens array 311 shown in FIG. 1. In other words, the illumination light axis Ax2 is set on an extended line of the illumination light axis Ax.

Configuration of Light Source Section

The light source section 41 is provided with a light source 411 for emitting the light, and collimator lenses 414.

The light source 411 is provided with a plurality of solid-state light sources 412 as the light emitting elements, and a support member 413.

The solid-state light sources 412 are each a semiconductor laser for emitting blue light L1s, which is s-polarized light as excitation light. The blue light L1s is, for example, a laser beam with a peak wavelength of 440 nm.

The support member 413 supports the plurality of solid-state light sources 412 arranged in an array on a plane perpendicular to the illumination light axis Ax1. The support member 413 is a metallic member having thermal conductivity.

The blue light L1s having been emitted from the solid-state light source 412 is collimated into a parallel light beam by the collimator lens 414, and the parallel light beam enters the afocal optical element 42.

It should be noted that in the present embodiment, the light source 411 has a configuration of emitting the blue light L1s which is s-polarized light as linearly polarized light beams the same in polarization direction. However, this is not a limitation, and the light source 411 can also be provided with a configuration of emitting blue light which is linearly polarized light beams different in polarization direction. In this case, the first retardation element 43 can be omitted.

Configuration of Afocal Optical Element

The afocal optical element 42 adjusts the beam diameter of the blue light L1s which enter the afocal optical element 42 from the light source section 41, and then makes the blue light L1s enter the first retardation element 43. The afocal optical element 42 is constituted by a lens 421 for collecting the incident light, and a lens 422 for collimating the light beam collected by the lens 421.

Configuration of First Retardation Element

The first retardation element 43 is disposed on the light path between the afocal optical element 42 and the homogenizer optical element 44, more specifically, between the lens 422 and a multi-lens array 441 constituting the homogenizer optical element 44. The first retardation element 43 is disposed so as to be able to rotate along a surface which the blue light L1s enters, namely a plane perpendicular to the illumination light axis Ax1. The first retardation element 43 is formed of a ½ wave plate with respect to the wavelength 446 nm of the blue light L1s. The optical axis of the first retardation element 43 crosses the polarizing axis of the blue light L1s entering the first retardation element 43. It should be noted that the optical axis of the first retardation element 43 can be either of a fast axis and a slow axis of the first retardation element 43.

The blue light L1s is coherent s-polarized light. Although the blue light L1s is originally the s-polarized light, the polarization axis of the blue light L1s crosses the optical axis of the first retardation element 43. Therefore, when the blue light L1s is transmitted through the first retardation element 43, the s-polarized light is partially converted into p-polarized light. Therefore, the blue light having been transmitted through the first retardation element 43 becomes light including the blue light L1s as the original s-polarized light and blue light L2p as the p-polarized light are mixed in a predetermined proportion.

It should be noted that it is also possible for the light source device 4 to be provided with a motor for rotating the first retardation element 43.

Configuration of Homogenizer Optical Element

The homogenizer optical element 44 homogenizes the illuminance distribution of the blue light L1s, L2p. The homogenizer optical element 44 is formed of a pair of multi-lens arrays 441, 442.

Configuration of Polarization Split Element

The blue light L1s, L2p having passed through the homogenizer optical element 44 enters the polarization split element 45.

The polarization split element 45 is a prism-type polarization beam splitter, and separates an s-polarization component and a p-polarization component included in the incident light from each other. Specifically, the polarization split element 45 reflects the s-polarization component, and transmits the p-polarization component. Further, the polarization split element 45 has a color separation characteristic of transmitting light with the wavelength no shorter than a predetermined wavelength irrespective of whether the polarization component is the s-polarization component or the p-polarization component. Therefore, the blue light L1s as the s-polarized light is reflected by the polarization split element 45, and then enters the first light collection element 46. Meanwhile, the blue light L2p as the p-polarized light is transmitted through the polarization split element 45, and then enters the second retardation element 47.

Configuration of First Light Collection Element

The first light collection element 46 converges the blue light L1s having been reflected by the polarization split element 45 on the wavelength conversion device 5. Further, the first light collection element 46 collimates fluorescence YL entering the first light collection element 46 from the wavelength conversion device 5. Although the first light collection element 46 is constituted by two lenses 461, 462 in the example shown in FIG. 2, the number of the lenses constituting the first light collection element 46 does not matter.

Configuration of Wavelength Conversion Device

The wavelength conversion device 5 is excited by the light entering the wavelength conversion device 5, and emits light having a wavelength different from the wavelength of the light having entered the wavelength conversion device 5 to the first light collection element 46. In other words, the wavelength conversion device 5 converts the wavelength of the incident light.

In the present embodiment, the wavelength conversion device 5 is provided with a wavelength conversion element 51 for emitting the fluorescence YL having the wavelength longer than the wavelength of the blue light L1s in response to incidence of the blue light L1s as the excitation light, and a rotary section RT for rotating the wavelength conversion element 51 around a rotational axis Rx parallel to the illumination light axis Ax2 as a predetermined rotational axis. It should be noted that the rotational axis Rx of the wavelength conversion element 51 is a rotational axis along the incident direction of the blue light L1s as the excitation light.

Among these, the wavelength conversion element 51 is a reflective wavelength conversion element for emitting the fluorescence YL toward the incident side of the blue light L1s. It should be noted that the fluorescence YL is, for example, light having a peak wavelength in a range of 500 nm through 700 nm. In other words, the fluorescence YL includes a green light component and a red light component.

The configuration of such a wavelength conversion element 51 will be described later in detail.

The fluorescence YL having been emitted from the wavelength conversion device 5 passes through the first light collection element 46 along the illumination light axis Ax2, and then enters the polarization split element 45. Then, the fluorescence YL passes through the polarization split element 45 along the illumination light axis Ax2.

Configuration of Second Retardation Element

The second retardation element 47 is disposed between the polarization split element 45 and the second light collection element 48. The second retardation element 47 is a ¼ wave plate, and the blue light L2p as the p-polarized light having passed through the polarization split element 45 is converted by the second retardation element 47 into blue light L2c as circularly polarized light, and then enters the second light collection element 48.

Configuration of Second Light Collection Element

The second light collection element 48 converges the blue light L2c entering the second light collection element 48 from the first retardation element 47 on the diffusely reflecting device 49. Further, the second light collection element 48 collimates the blue light L2c entering the second light collection element 48 from the diffusely reflecting device 49. It should be noted that the number of lenses constituting the second light collection element 48 can arbitrarily be changed.

Configuration of Diffusely Reflecting Device

The diffusely reflecting device 49 diffusely reflects the blue light L2c having entered the diffusely reflecting device 49 from the second light collection element 48 toward the polarization split element 45 at substantially the same diffusion angle as that of the fluorescence YL emitted from the wavelength conversion device 5. As a configuration of the diffusely reflecting device 49, there can be illustrated a configuration provided with a reflecting plate for performing Lambertian reflection on the blue light L2c having entered the reflecting plate, and a rotation device for rotating the reflecting plate around a rotational axis parallel to the illumination light axis Ax1. In the light source device 4, by diffusely reflecting the blue light L2c using this kind of diffusely reflecting device 49, it is possible to obtain blue light having a substantially uniform illuminance distribution.

As shown in FIG. 2, the blue light L2c having diffusely been reflected by the diffusely reflecting device 49 passes through the second light collection element 48, and then enters the second retardation element 47 once again. The blue light L2c is converted into circularly polarized light with the opposite rotational direction when reflected by the diffusely reflecting device 49. Therefore, the blue light L2c entering the second retardation element 47 from the second light collection element 48 is converted by the second retardation element 47 not into the blue light L2p as the p-polarized light which enters the second retardation element 47 from the polarization split element 45, but into the blue light L2s as the s-polarized light. Then, the blue light L2s as the s-polarized light is reflected by the polarization split element 45, and then enters the homogenizing device 31 described above along the illumination light axis Ax2 together with the fluorescence YL.

Configuration of Wavelength Conversion Element

Figure 3:
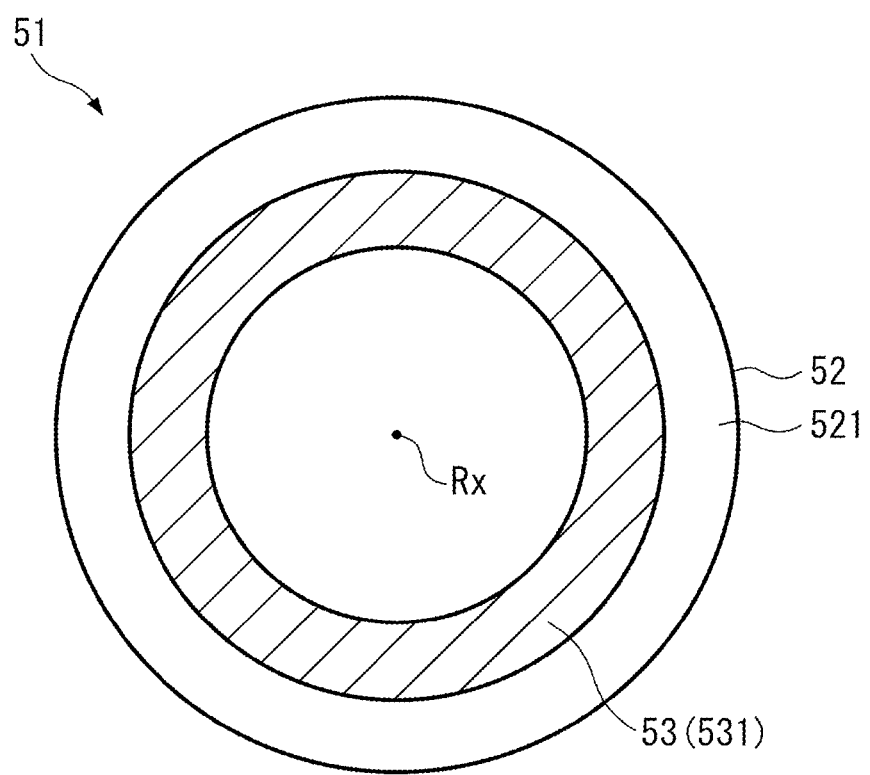
FIG. 3 is a plan view of a wavelength conversion element in the embodiment viewed from an incident side of excitation light.
Figure 4:
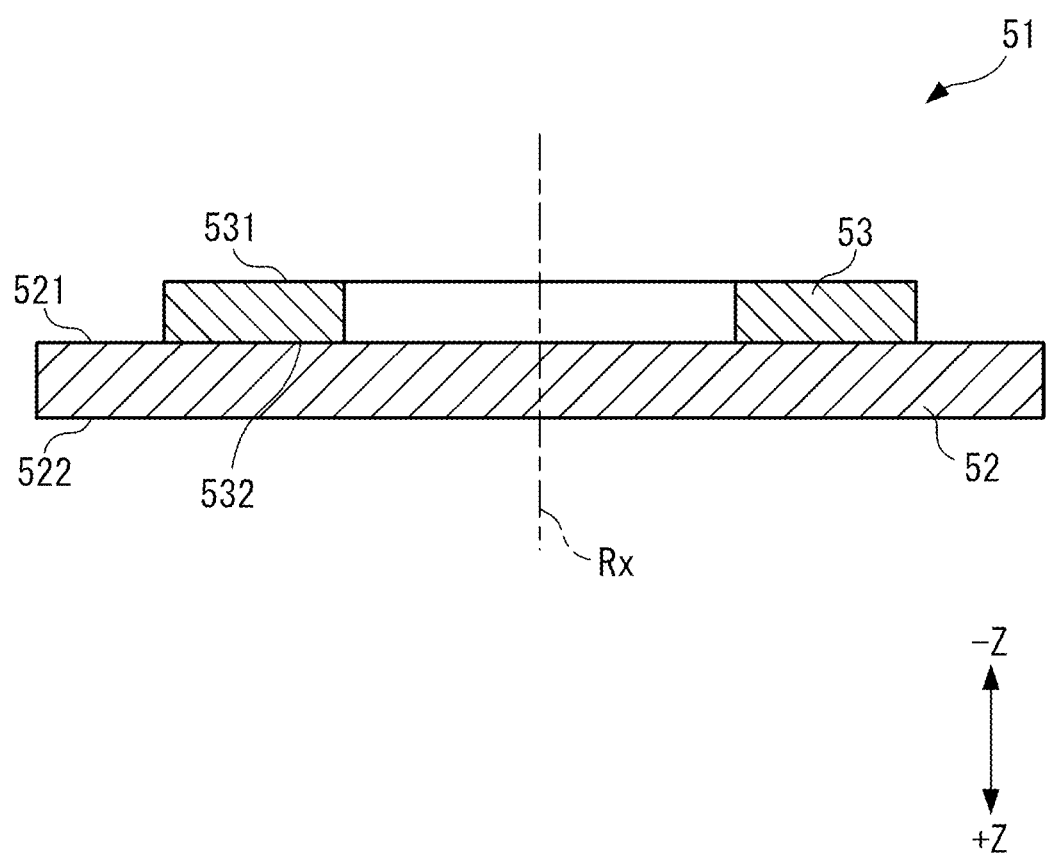
FIG. 4 is a schematic diagram showing a cross-sectional surface of the wavelength conversion element in the embodiment.

FIG. 3 is a plan view of the wavelength conversion element 51 viewed from the incident side of the excitation light. FIG. 4 is a diagram schematically showing a cross-sectional surface of the wavelength conversion element 51.

The wavelength conversion element 51 is a reflective wavelength conversion element for emitting the fluorescence as the light having a different wavelength from the wavelength of the excitation light toward the incident side of the excitation light. As shown in FIG. 3 and FIG. 4, the wavelength conversion element 51 has a holding member 52 and a phosphor layer 53. It should be noted that the wavelength conversion element 51 is manufactured using a manufacturing method described later.

It should be noted that in the following description and the drawings, the blue light L1s entering the phosphor layer 53 is described as excitation light for exciting the phosphor particles included in the phosphor layer 53. Further, the incident direction of the excitation light to the phosphor layer 53 is defined as a +Z direction, and an opposite direction to the +Z direction is defined as a −Z direction.

Configuration of Holding Member

The holding member 52 holds the phosphor layer 53. Further, the holding member 52 is also a radiator member for releasing the heat transferred from the phosphor layer 53. The holding member 52 is formed to have a disk-like shape viewed from the −Z direction. The holding member 52 is rotated together with the phosphor layer 53 around the rotational axis Rx by the rotary section RT. In the present embodiment, the holding member 52 is an alumina substrate formed of alumina. Further, the holding member 52 is an alumina substrate including pores. In other words, the holding member 52 includes alumina, and is provided with the pores.

As shown in FIG. 4, the holding member 52 has a first surface 521 as a surface on the −Z direction side, and a second surface 522 as a surface on the +Z direction side.

The first surface 521 is bonded to the phosphor layer 53 to hold the phosphor layer 53. In other words, the first surface 521 is a reflecting surface for reflecting the light entering the first surface 521 from the phosphor layer 53 toward the −Z direction, and at the same time, is a contact part having direct contact with the phosphor layer 53. It should be noted that since the holding member 52 is formed of the alumina substrate provided with the pores, the first surface 521 has high reflectance.

The second surface 522 is a surface on the opposite side to the first surface 521. It is also possible for the second surface 522 to be provided with a radiator section which increases in contact area with the ambient gas to thereby increase the radiation efficiency of the heat transferred to the holding member 52.

It should be noted that in the present embodiment, the holding member 52 as the alumina substrate reflects the light entering the holding member 52 from the phosphor layer 53. However, this is not a limitation, and the holding member 52 can be provided with a configuration having a substrate main body formed of metal or the like, and a reflecting layer including alumina disposed on a surface on the −Z direction side in the substrate main body so as to be opposed to the phosphor layer 53. In this case, the reflecting layer can be disposed on the entire area of the surface on the −Z direction side in the substrate main body, or can also be disposed only in a region opposed to the phosphor layer 53. Even in this case, the reflecting layer is a contact part having direct contact with the phosphor layer 53, and becomes a holding section for holding the phosphor layer 53. Further, the reflecting layer including the alumina is provided with the pores.

Configuration of Phosphor Layer

The phosphor layer 53 is disposed on the −Z direction side as the incident side of the excitation light with respect to the holding member 52. The phosphor layer 53 converts the excitation light entering the phosphor layer 53 into fluorescence, and then emits the fluorescence. In other words, the phosphor layer 53 performs the wavelength conversion on the excitation light entering the phosphor layer 53 to generate and then emit the fluorescence as the light having a longer wavelength than the wavelength of the excitation light. As shown in FIG. 3, the phosphor layer 53 is formed to have an annular shape centered on the rotational axis Rx of the wavelength conversion element 51 when viewed from the −Z direction.

As shown in FIG. 4, the phosphor layer 53 has a first surface 531 as a surface on the −Z direction side, and a second surface 532 as a surface on the +Z direction side, and a surface on an opposite side to the first surface 531.

The first surface 531 is a plane of incidence which the excitation light enters, and is an exit surface from which the fluorescence is emitted. The second surface 532 is an opposed surface opposed to the holding member 52.

Figure 5:
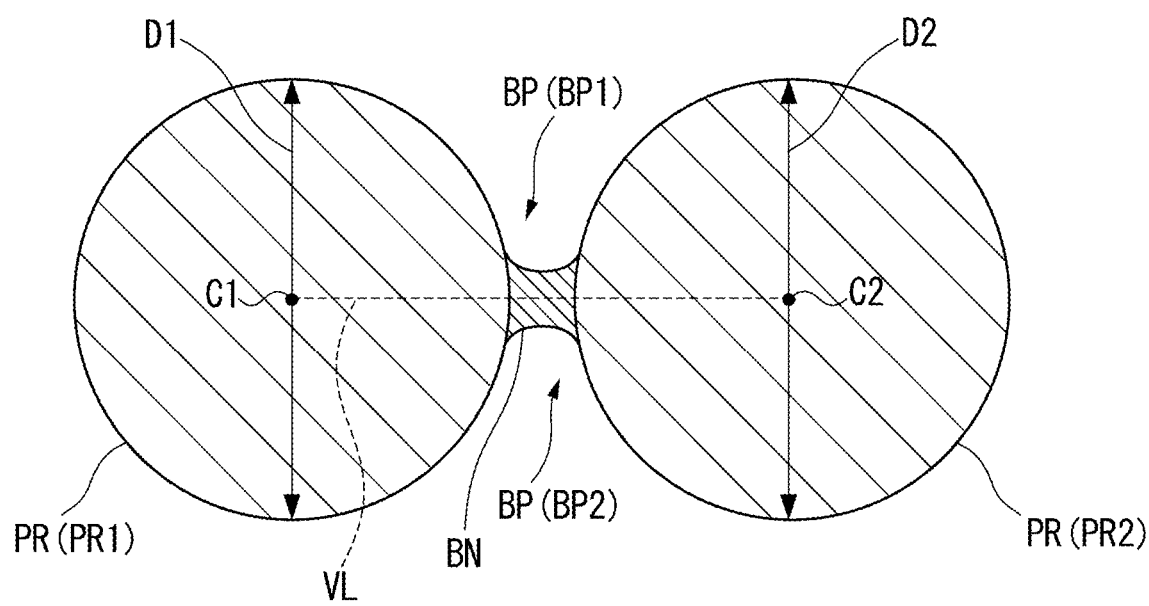
FIG. 5 is a schematic diagram showing a binding state of phosphor particles with a binder in the embodiment.

FIG. 5 is a schematic diagram showing phosphor particles PR (PR1, PR2) bound to each other with the binder BN.

The phosphor layer 53 includes the plurality of phosphor particles and the binder including glass, and has the configuration in which the phosphor particles are bound to each other with the binder. As shown in, for example, FIG. 5, the two phosphor particles PR (PR1, PR2) adjacent to each other are bound to each other by the binder BN partially binding the surfaces of the respective phosphor particles.

The phosphor particles PR are each a particle including a phosphor material and an activator agent to be the light emission center. As the activator agent, there can be cited, for example, Ce, Eu, Pr, Cr, Gd, and Ga. As the phosphor material, there can be adopted a YAG phosphor material. However, this is not a limitation, and as the phosphor material, it is possible to adopt a phosphor material obtained by displacing Y in the YAG phosphor with Lu, Gd, or GA, or it is also possible to adopt a KSF phosphor material, an SCASN phosphor material, or the like instead of the YAG phosphor material. Further, the phosphor material can also be a mixture of a plurality of phosphor materials.

As the binder BN, there is used borosilicate glass in the present embodiment, but phosphate glass can also be adopted. In other words, the binder BN includes borosilicate glass.

It should be noted that microscopic voids are disposed inside the phosphor layer 53. Since such voids are included, spread of the fluorescence inside the phosphor layer 53 is suppressed, and by taking out the fluorescence from the phosphor layer 53 in a small range, the light collection efficiency of the optical system can be enhanced.

The binding part with the binder BN in the phosphor particle PR is hereinafter defined as a binding part BP. For example, the binding part with the binder BN in the phosphor particle PR1 is defined as the binding part BP (BP1), and the binding part with the binder BN in the phosphor particle PR2 is defined as the binding part BP (BP2).

Relationship Between Area of Binding Part in Phosphor Particle and Brightness in Optical System In the present embodiment, in order to increase the luminance of the light transmitted through the optical device 30 as the optical system which the illumination light including the fluorescence emitted from the phosphor layer 53 enters, the area of the binding part BP is set to a value no higher than 10% of the surface area of the phosphor particle PR. In the detailed description, the area of the binding part BP is set to a value within a range no lower than 3% and no higher than 5% of the surface area of the phosphor particle PR. In other words, the phosphor particles PR each have the binding part BP joined to the binder in a part of the surface of the phosphor particle PR. Such a numerical range derives from the result of the following experiment.

Figure 6:
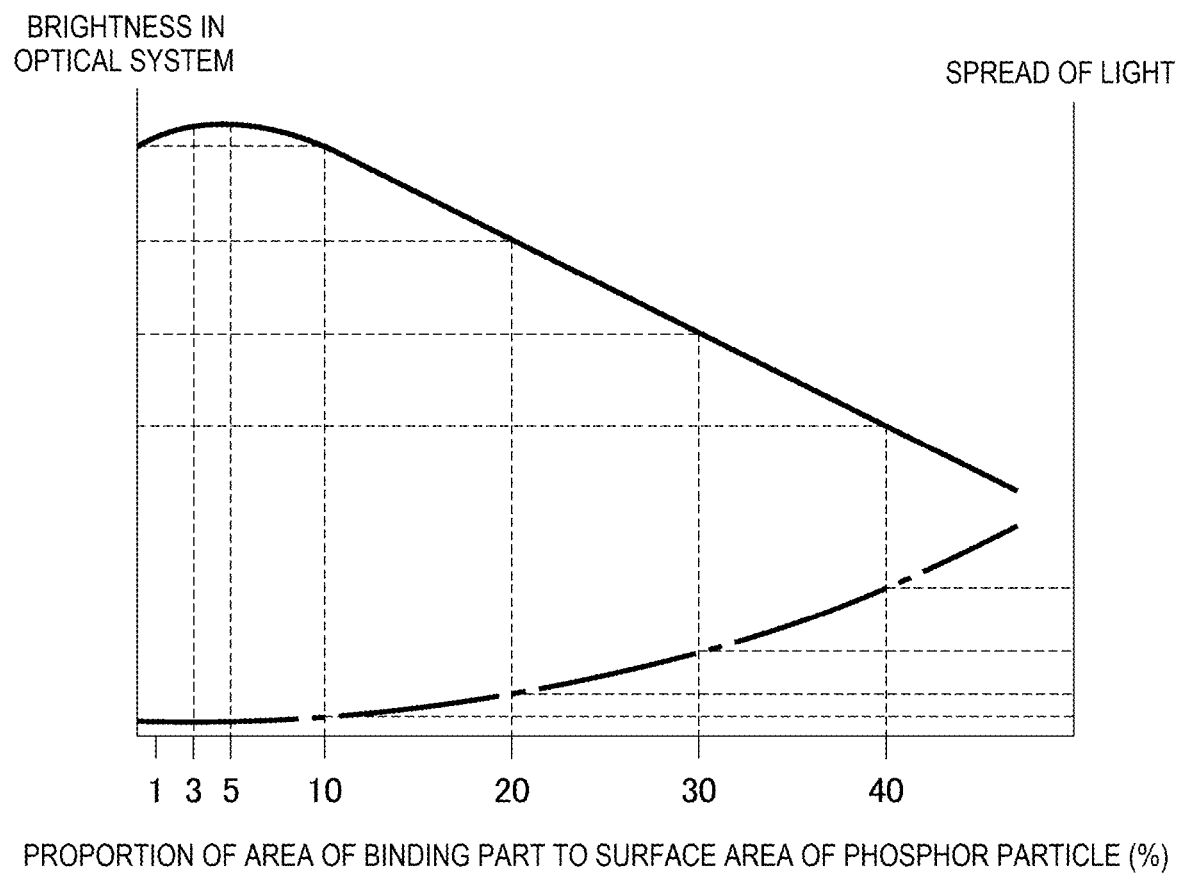
FIG. 6 is a graph showing brightness and spread of light in an optical system with respect to the area of the binding part in the embodiment.

FIG. 6 is a graph showing the brightness in the optical system in the optical device 30 and the spread of the light with respect to the proportion of the area of the binding part BP to the surface area of the phosphor particle PR.

The inventors conducted an experiment of measuring the spread of the light emitted from the phosphor layer 53 and the brightness in the optical system in the optical device 30 while changing the proportion of the area of the binding part BP to the surface area of the phosphor particle PR. It should be noted that the brightness in the optical system mentioned here represents the intensity of the light which can be converged on the light modulation devices 343. Further, the spread of the light is a proportion of the area of the exit region of the fluorescence to the area of the incident region of the excitation light in the first surface 541 of the phosphor layer 54. In the following description, the proportion of the area of the binding part BP to the surface area of the phosphor particle PR is abbreviated as an area proportion.

The higher the area proportion was, the broader the spread of the light emitted from the phosphor layer 53 became as represented by the dashed-dotted line in FIG. 6. In other words, the larger the area of the binding part BP was, the broader the spread of the light emitted from the phosphor layer 53 became.

As represented by the solid line in FIG. 6, it was found out that it was not true that the lower the area proportion was the higher the brightness in the optical system became, but there existed the maximum value (the highest value) in the brightness in the optical system.

In the detailed description, in the range in which the area proportion was no higher than 10%, the brightness in the optical system increased and then decreased as the area proportion increased. Further, it was found out that the maximum value of the brightness in the optical system appeared when the area proportion was in the range of no lower than 3% and no higher than 5%.

In contrast, in a range in which the area proportion exceeded 10%, the brightness in the optical system was lower than the value when the area proportion was 0%, and the higher the area proportion was, the lower the brightness in the optical system became.

In other words, it was found out that the brightness in the optical system became higher when the area proportion was no higher than 10% than the value when the area proportion was 0%, and took the maximum value when the area proportion was in the range of no lower than 3% and no higher than 5%.

It is conceivable that the reason that there exists the range of the area proportion in which the brightness in the optical system takes the high value as described above is as follows.

The refractive index of the phosphor particles PR is about 1.8. In contrast, the refractive index of the borosilicate glass constituting the binder BN is about 1.5.

Therefore, the fluorescence having been generated inside the phosphor particle PR and then entered the binding part BP propagates the binder BN from the binding part BP to proceed to the inside of the adjacent phosphor particles PR.

In contrast, since the voids are disposed inside the phosphor layer 53, other areas than the binding part BP have contact with air on the outside surface of each of the phosphor particles PR. Therefore, in accordance with the Fresnel formula, the fluorescence which is generated inside the phosphor particle PR and then enters the other areas than the binding part BP in the outside surface of the phosphor particle PR is mostly emitted outside the phosphor particle PR and partially reflected inside the phosphor particle PR, or is totally reflected inside the phosphor particle PR.

When the area proportion is high, the amount of fluorescence entering the binding part BP increases. In other words, when the area proportion is high, the amount of fluorescence propagating the binder BN via the binding part BP increases. In this case, since a difference between the refractive index of the phosphor particles PR and the refractive index of the binder BN is small, and the refraction on the interface between the phosphor particle PR and the binder BN is small, the fluorescence becomes apt to spread to the neighboring phosphor particles PR. Therefore, the fluorescence goes out from the first surface 531 of the phosphor layer 53 to the outside as a light source broad in spread. Thus, the fluorescence having been emitted from the phosphor layer 53 becomes difficult to be converged on the light modulation devices 343 of the optical device 30 as the optical system. In other words, in this case, the brightness in the optical system lowers.

When the area proportion is low, the fluorescence generated inside the phosphor particle PR becomes easy to enter the other areas than the binding part BP on the outside surface of the phosphor particle PR, namely the interface with the air. Therefore, since the intensity of the fluorescence refracted on the interface between the phosphor particle PR and the air, and emitted from the phosphor particle PR, and the intensity of the fluorescence totally reflected increase, the fluorescence is prevented from spreading to the phosphor particles PR in a neighboring broad range, and the fluorescence goes out as the light source small in spread to the outside from the first surface 531 of the phosphor layer 53. Such fluorescence is apt to converge on the light modulation devices 343. In other words, in this case, the brightness in the optical system rises.

In contrast, when the area proportion has such an extremely small value as, for example, a value no higher than 1%, the fluorescence becomes apt to be confined inside the phosphor particle PR. In this case, the reflection of the fluorescence on the interface with the air becomes apt to be repeated, and thus, the light path length of the fluorescence increases. As described above, by the fluorescence passing through the phosphor particle PR many times, self-absorption becomes apt to occur. The self-absorption is a phenomenon that the phosphor absorbs the fluorescence to generate heat since the emission wavelength of the phosphor partially overlaps the absorption wavelength of the phosphor. When such self-absorption occurs, the intensity of the fluorescence emitted from the phosphor layer 53 decreases, and by extension, the brightness in the optical system decreases.

On the other hand, when the frequency of the reflection and the refraction on the interface with the air in the phosphor particle PR increases, the excitation light with which the phosphor particles PR are irradiated from the outside of the phosphor layer 53 becomes apt to be reflected by the surface of each of the phosphor particles PR, or the inside of each of the phosphor particles PR. The intensity of the excitation light which is radiated outside the phosphor layer 53 without being converted into the fluorescence increases. In other words, backward scattering (backscatter) of the excitation light becomes apt to occur. In this case, by the intensity of the excitation light to be converted into the fluorescence decreasing, the intensity of the fluorescence emitted from the phosphor layer 53 decreases, and by extension, the brightness in the optical system can decrease.

According to such a consideration, it has been understood that in order to increase the brightness in the optical system, the area proportion preferably has a value no higher than 10%, and more preferably has a value no lower than 3% and no higher than 5%.

Size of Binding Part to Binder in Phosphor Particle

In the present embodiment, in order to make the proportion of the area of the binding part BP to the surface area of the phosphor particle PR no higher than 10%, the phosphor layer 53 is manufactured so that the size of the binding part BP becomes the following size. It should be noted that as shown in FIG. 5, in the following description, the two axes which are perpendicular to an imaginary line VL connecting the centers C1, C2 of the respective phosphor particles PR1, PR2 bound to each other with the binder BN, and are perpendicular to each other are defined as an X axis and a Y axis.

In the present embodiment, the dimension in the Y axis of the binding part BP1 is made no larger than ¼ of the diameter D1 of the phosphor particle PR1, and although not shown in the drawing, the dimension in the X axis of the binding part BP1 is made no larger than ¼ of the diameter D1 of the phosphor particle PR1. In other words, the dimension in the Y axis of the binding part BP1 is made no larger than ¼ of the size in the Y axis of the phosphor particle PR1, and although not shown in the drawing, the dimension in the X axis of the binding part BP1 is made no larger than ¼ of the size in the X axis of the phosphor particle PR1.

Similarly, the dimension in the Y axis of the binding part BP2 is made no larger than ¼ of the diameter D2 of the phosphor particle PR2, and although not shown in the drawing, the dimension in the X axis of the binding part BP2 is made no larger than ¼ of the diameter D2 of the phosphor particle PR2. In other words, the dimension in the Y axis of the binding part BP2 is made no larger than ¼ of the size in the Y axis of the phosphor particle PR2, and although not shown in the drawing, the dimension in the X axis of the binding part BP2 is made no larger than ¼ of the size in the X axis of the phosphor particle PR2.

Further, the thickness of the binder BN, namely the dimension of the binder BN along the imaginary line VL is made no larger than 1/10 of the diameter of the phosphor particle PR.

As described above, since the dimension of the binding part BP is the size described above, the proportion described above becomes the value no higher than 10%, and it is possible to increase the brightness in the optical system.

Calculational Size of Binding Part

The area proportion described above for increasing the brightness in the optical system is also supported by a calculation result based on the diameter of the phosphor particle PR.

When the phosphor particles PR included in the phosphor layer 53 are each assumed to have a spherical shape, the surface area of the phosphor particle with a radius of R is $4\pi \cdot R^2$.

In contrast, when the phosphor particles PR each having a spherical shape and uniformed in particle diameter are densely arranged, the filling rate of the phosphor particles PR per unit volume is typically 60 through 75%. In this case, the number of other phosphor particles PR having contact with one phosphor particle PR is 8 through 12.

When the number of the other phosphor particles PR having contact with the one phosphor particle PR is assumed as 8, and the binder BN is assumed as a circular cylinder having a thickness of t and a radius of r, the total area of the binding part BP is $8\pi \cdot r^2$. It should be noted that the thickness of the binder BN is a dimension along the imaginary line VL shown in FIG. 5.

According to the above, the area proportion described above is obtained as $8\pi \cdot r^2/(4\pi \cdot R^2)$. In other words, the area proportion described above becomes $2r^2/R^2$.

When assuming the radius R of the phosphor particle PR as 12 μm, and assuming the proportion of the binding part BP to the surface area of the phosphor particle PR as 5% (=0.05) based on the experimental result described above, the radius r of the binding part BP becomes about 1.89 μm. In other words, the radius r of the binding part BP when using a circle as the shape of the binding part BP in the phosphor particle PR becomes about 2 μm, and the diameter of the binding part BP becomes about 4 μm. Further, assuming the number of the other phosphor particles PR having contact with the one phosphor particle PR as 12, the radius r of the binding part BP becomes about 3 μm, and the diameter of the binding part BP becomes about 6 μm. Therefore, the radius r of the binding part BP is about 2 through 3 μm, and the diameter of the binding part BP is about 4 through 6 μm.

The diameter of the binding part BP obtained by such calculation is a value no larger than ¼ of the diameter 24 μm of the phosphor particle PR based on the assumption described above. In other words, the dimensions in the X axis and the Y axis of the binding part BP are each a value no larger than ¼ of the diameter of the phosphor particle PR.

As described hereinabove, by setting the dimension of the binding part BP to the size described above with respect to the diameter of the phosphor particle PR, it is possible to make the area proportion described above no higher than 10%, and by extension, it is possible to increase the brightness in the optical system.

The size of such a binding part BP can be achieved by adjusting the temperature when manufacturing the phosphor layer 53 although described later in detail. This point will be described in a method of manufacturing the wavelength conversion element 51.

Glass Content Rate in Phosphor Layer

Figure 7:
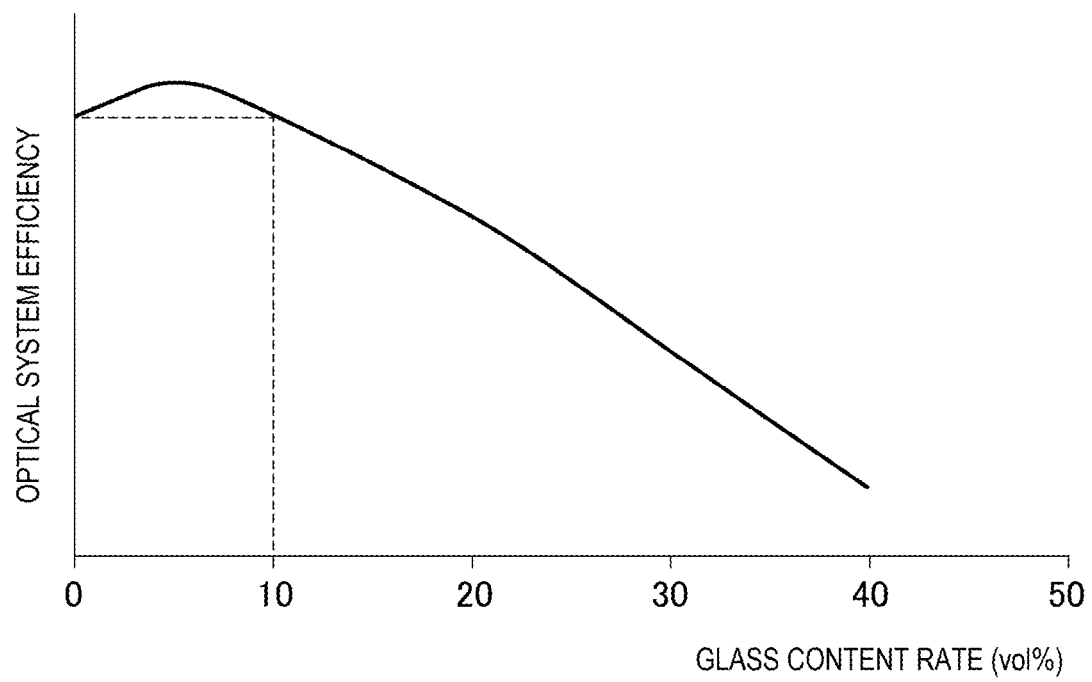
FIG. 7 is a graph showing a relationship between a glass content rate and optical system efficiency in the embodiment.

FIG. 7 is a graph showing a relationship between a glass content rate of the phosphor layer 53 and optical system efficiency.

It should be noted that the glass content rate is represented by volume percent (vol %) of the binder BN in the phosphor layer 53. Specifically, the glass content rate is "100*(volume of glass)/((volume of glass)+(volume of phosphor particles))," and the volume of the voids is not included.

In other words, the glass content rate mentioned here is not a measured value of the wavelength conversion element 51 after being manufactured, but is a value based on the volume percent of the input of the binder BN and the phosphor particles PR in a paste preparation step S1 and a phosphor mixing step S2 (see FIG. 13) in the process of manufacturing the wavelength conversion element 51 described later.

In contrast, the optical system efficiency is "(the intensity of the light having been emitted from the phosphor layer 53, transmitted through the optical device 30 as the optical system, and then emitted from the projection optical device 36)/(the intensity of the excitation light with which the phosphor layer 53 has been irradiated)." Therefore, the optical system efficiency is neither "(the intensity of the light having been emitted from the phosphor layer 53 and then entered the optical device 30)/(the intensity of the excitation light with which the phosphor layer 53 has been irradiated)" nor the wavelength conversion efficiency expressed by "(the intensity of the light having been emitted from the phosphor layer 53)/(the intensity of the excitation light with which the phosphor layer 53 has been irradiated)."

In other words, the optical system efficiency is the efficiency including etendue, and can be rephrased as the light use efficiency in the optical device 30 of the projector 1.

As shown in FIG. 7, in the phosphor layer 53 related to the present embodiment, in a range in which the glass content rate is higher than 0 vol % and no higher than 10 vol %, the optical system efficiency is made higher compared to when the glass content rate is 0 vol %. Further, when the glass content rate is 10 vol %, the optical system efficiency takes substantially the same value as when the glass content rate is 0 vol %.

When the glass content rate exceeds 10 vol %, the optical system efficiency lowers compared to when the glass content rate is 0 vol %. It is conceivable that this is because the fluorescence spreads in the phosphor layer 53 while the loss caused by the fluorescence being reflected and refracted on the interface between the phosphor particle PR and the binder BN decreases as described above, the spread of the light when the fluorescence is emitted from the phosphor layer 53 increases, and the intensity of the light which can be used in the optical device 30 as the optical system decreases to appear as a difference in measurement value. Further, it is conceivable that the reason that the peak is shown in a range of 0 through 10% is that when the binder BN is extremely small in amount, the excitation light repeats the reflection and the refraction a number of times on the interface between the phosphor particle PR and the void (air), and thus, the excitation light is discharged from the phosphor layer 53 before exciting the phosphor.

Figure 8:
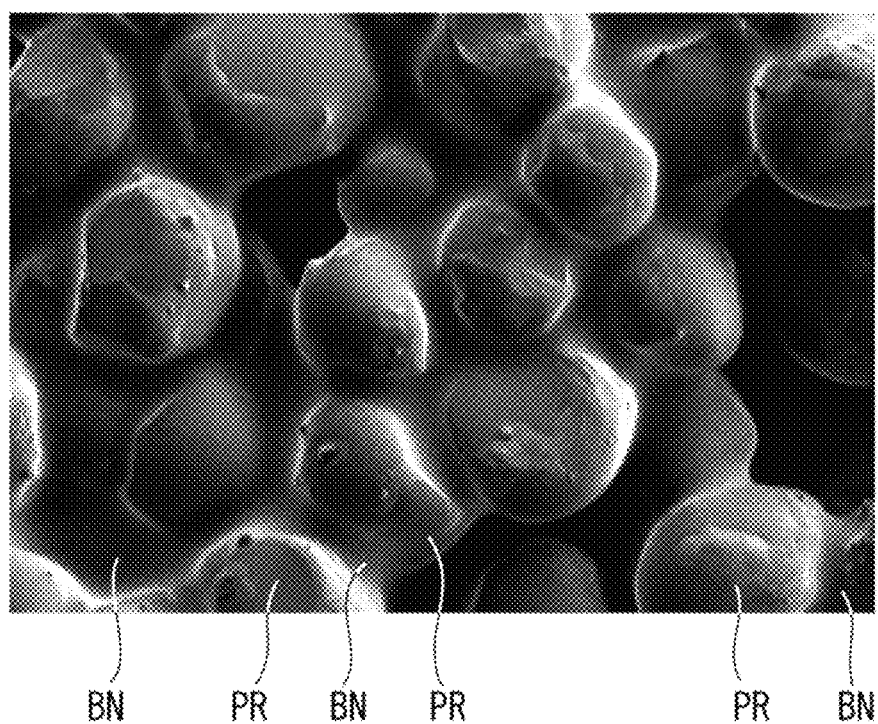
FIG. 8 is a diagram of an image showing a phosphor layer the glass content rate of which is 30 vol %, and which is formed at a calcination temperature of 1000° C. in the embodiment.

FIG. 8 shows an image obtained when observing the phosphor layer the glass content rate of which is 30 vol %, and which is formed at calcination temperature of 1000° C.

with an SEM (Scanning Electron Microscope). The image observed by the SEM is hereinafter abbreviated as an SEM image.

Figure 9:
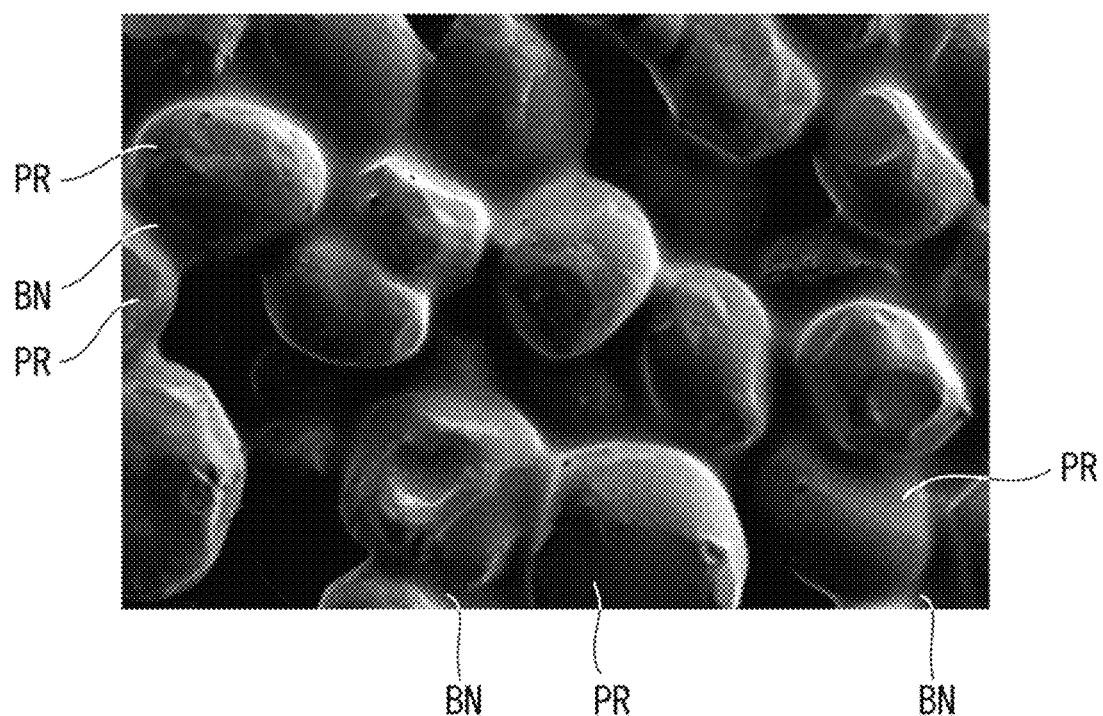
FIG. 9 is a diagram of an image showing a phosphor layer the glass content rate of which is 20 vol %, and which is formed at the calcination temperature of 1000° C. in the embodiment.
Figure 10:
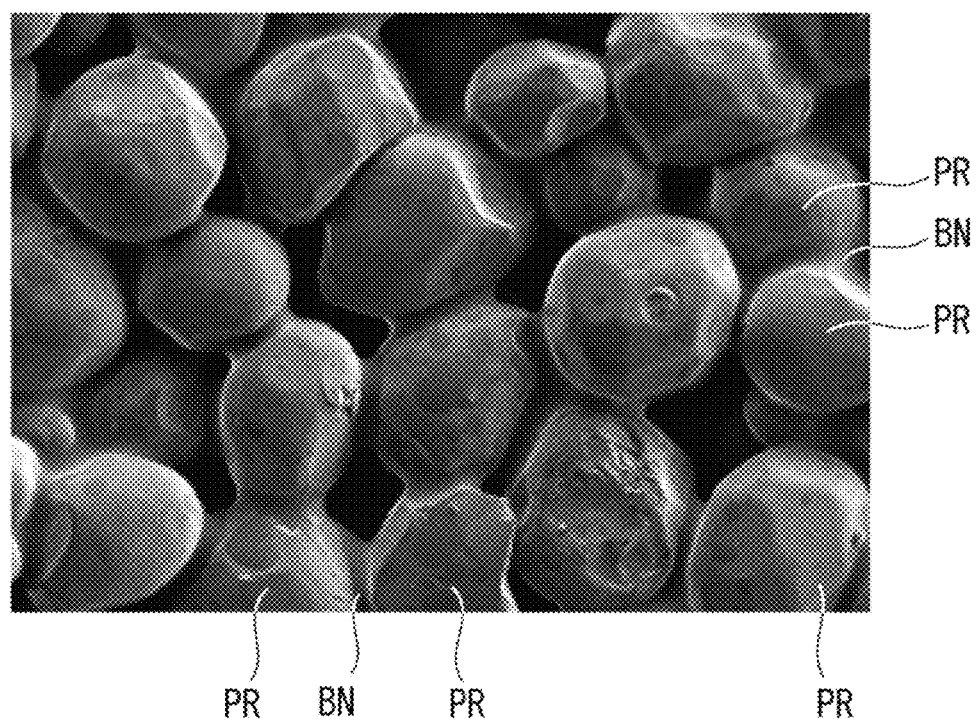
FIG. 10 is a diagram of an image showing a phosphor layer the glass content rate of which is 10 vol %, and which is formed at the calcination temperature of 1000° C. in the embodiment.
Figure 11:
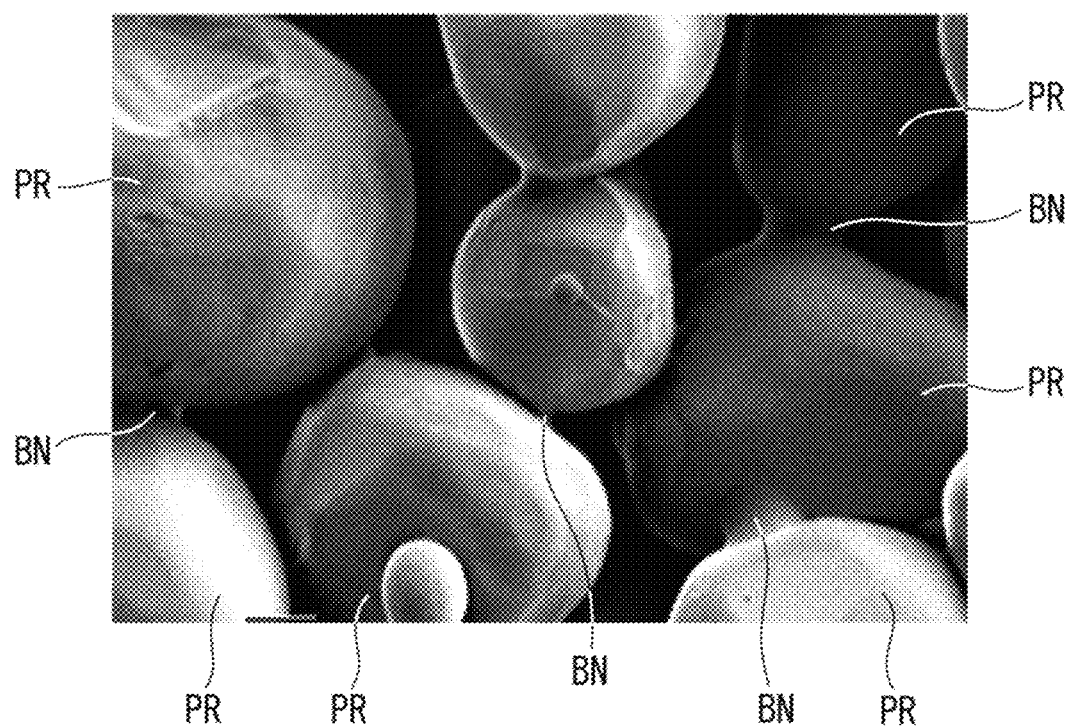
FIG. 11 is a diagram of an image showing a phosphor layer the glass content rate of which is 5 vol %, and which is formed at the calcination temperature of 1000° C. in the embodiment.
Figure 12:
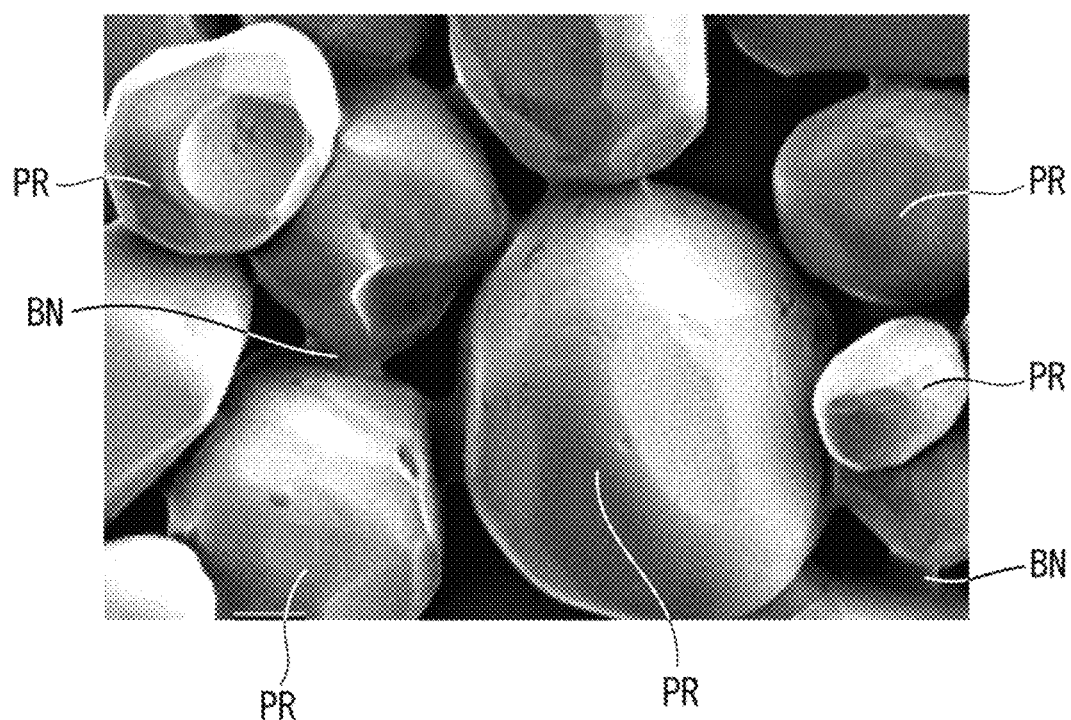
FIG. 12 is a diagram of an image showing a phosphor layer the glass content rate of which is 3 vol %, and which is formed at the calcination temperature of 1000° C. in the embodiment.

FIG. 9 shows an SEM image of the phosphor layer the glass content rate of which is 20 vol %, and which is formed at the calcination temperature of 1000° C. FIG. 10 shows an SEM image of the phosphor layer the glass content rate of which is 10 vol %, and which is formed at the calcination temperature of 1000° C. FIG. 11 shows an SEM image of the phosphor layer the glass content rate of which is 5 vol %, and which is formed at the calcination temperature of 1000° C. FIG. 12 shows an SEM image of the phosphor layer the glass content rate of which is 3 vol %, and which is formed at the calcination temperature of 1000° C.

In the phosphor layer the glass content rate of which is 30 vol %, and the phosphor layer the glass content rate of which is 20 vol %, the surface of all of the phosphor particles PR is substantially completely covered with the binder BN as shown in FIG. 8 and FIG. 9. In particular, in the phosphor layer the glass content rate of which is 30 vol % shown in FIG. 8, the phosphor particles PR are buried in the binder BN. When the phosphor particles PR are covered with the binder BN as borosilicate glass in such a manner, the fluorescence generated in the phosphor particles PR becomes easy to propagate the binder BN, the spread of the light emitted from the phosphor layer broadens, and the optical system efficiency decreases as described above.

In contrast, in the phosphor layers the glass content rates of which are 10 vol %, 5 vol %, and 3 vol %, respectively, the binder BN is disposed between the phosphor particles PR adjacent to each other, and the phosphor particles PR are not completely covered with the binder BN as shown in FIG. 10 through FIG. 12. In particular, in the phosphor layers the glass content rates of which are 5 vol % and 3 vol %, respectively, the binder BN is only disposed between the phosphor particles PR adjacent to each other, and the surface of each of the phosphor particles PR is almost exposed as shown in FIG. 11 and FIG. 12.

As described above, since the phosphor particles PR adjacent to each other are bound to each other in a part of the surface with the binder BN, and the other part is exposed, the spread of the light emitted from the phosphor layer decreases, and thus, the optical system efficiency is enhanced.

Therefore, by setting the glass content rate to the value within the range higher than 0 vol % and no higher than 10 vol %, it is possible to constitute the phosphor layer capable of increasing the optical system efficiency compared to when the glass content rate is 0 vol %, and when the glass content rate is higher than 10 vol %.

Method of Manufacturing Wavelength Conversion Element

Figure 13:
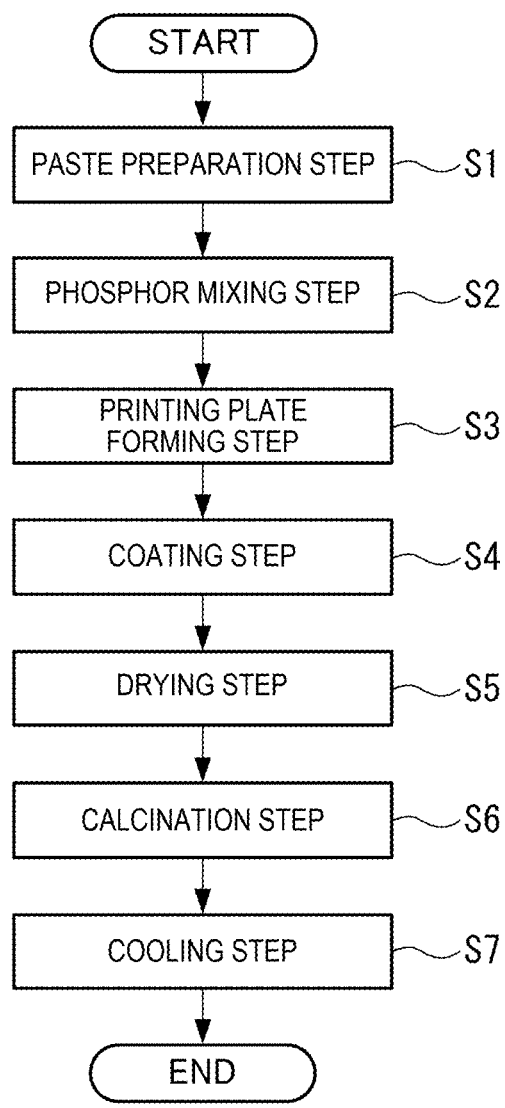
FIG. 13 is a flowchart showing a method of manufacturing the wavelength conversion element in the embodiment.

FIG. 13 is a flowchart showing the method of manufacturing the wavelength conversion element 51.

The method of manufacturing the wavelength conversion element 51 including the phosphor layer 53 described above will be described.

As shown in FIG. 13, the method of manufacturing the wavelength conversion element 51 includes the paste preparation step S1, the phosphor mixing step S2, a printing plate forming step S3, a coating step S4, a drying step S5, a calcination step S6, and a cooling step S7 to be executed in sequence. In other words, the method of manufacturing the wavelength conversion element 51 described hereinafter includes the manufacturing method according to the present disclosure.

The paste preparation step S1 and the phosphor mixing step S2 correspond to a preparation step.

The paste preparation step S1 is a step of mixing a binder constituent to form the binder BN after the calcination, resin such as ethyl cellulose, and a solvent for solving the binder constituent and the resin with each other to prepare a glass paste. It should be noted that the resin is for providing the paste with viscosity. Further, as the binder constituent, there can be cited what is obtained by fracturing the borosilicate glass including, for example, silica as much as 60% or more into particles having a diameter no larger than 1 μm.

The phosphor mixing step S2 is a step of preparing a mixture paste obtained by mixing the YAG phosphor in the glass paste thus prepared. The ratio between the YAG phosphor and the borosilicate glass as the binder constituent is set to a ratio within a range of 98:2 through 92:8 in the volume ratio. It should be noted that the range includes 98:2 and 92:8. More preferably, the ratio between the YAG phosphor and the borosilicate glass is set to a ratio within a range of 97:3 through 95:5 in the volume ratio. The range includes 97:3 and 95:5. By adjusting the ratio between the YAG phosphor and the borosilicate glass as described above, it is possible to set the glass content rate to a value within the range described above.

In the printing plate forming step S3, the printing plate is manufactured so that printing drops out in a circular shape.

In the coating step S4, the mixture paste prepared in the phosphor mixing step S2 is applied by printing with a thickness of 80 μm on the alumina substrate which has a disk-like shape to form the holding member 52, and is provided with the microscopic pores for reflection disposed inside using the printing plate thus manufactured. It should be noted that it is also possible to adopt a substrate having an alumina layer disposed on the substrate main body instead of the alumina substrate as described above.

In the drying step S5, the mixture paste applied on the alumina substrate is dried for a short time at around 100° C.

In the calcination step S6, the alumina substrate as the holding member 52 coated with the mixture paste is calcined for a short time while raising the temperature at the ratio of 10° C./minute up to 1000° C. by a firing furnace. When calcining the mixture paste in the calcination step S6, almost the whole of the resin and the solvent included in the mixture paste evaporates. It should be noted that the calcination temperature in the calcination step S6 will be described later in detail.

In the cooling step S7, the calcination substance obtained by calcining the mixture paste and the alumina substrate as the holding member 52 is cooled. Among the calcination substances cooled in the cooling step S7, the calcination substance deriving from the mixture paste forms the phosphor layer 53.

Due to the manufacturing method including the steps S1 through S7 described hereinabove, there is manufactured the wavelength conversion element 51 having the phosphor layer 53 the area proportion and the glass content rate of which are higher than 0% and no higher than 10%.

Figure 14:
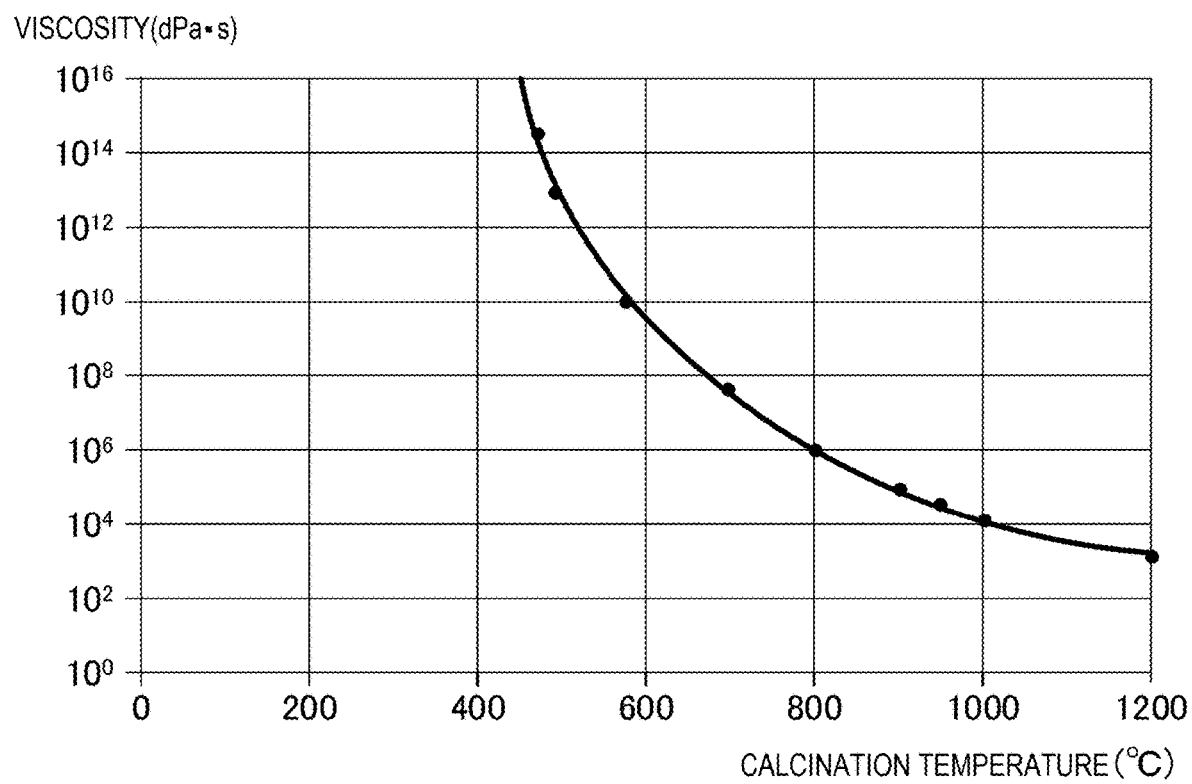
FIG. 14 is a graph showing a relationship between the calcination temperature and the viscosity of the glass in the embodiment.

Relationship Between Calcination Temperature and Viscosity of Glass in Calcination Process FIG. 14 is a graph showing a relationship between the calcination temperature and the viscosity of the glass.

As shown in FIG. 14, the viscosity of the glass decreases as the temperature rises, and the force due to the viscosity of the glass weakens as the viscosity decreases. Further, assuming that the softening point as a temperature at which the glass starts to conspicuously soften to deform under its own weight, and at which the viscosity becomes about $10^{7.6}$ dPa·s is 700° C., by making the calcination temperature in the calcination step S6 described above no lower than 800° C.

which is 100° C. higher than the softening point, the viscosity of the glass becomes no higher than $10^6$ dPa·s (=$10^6$ P).

Hereinafter, there is shown an SEM image of the phosphor layer manufactured by calcining the mixture paste having the glass content rate of 5 vol % at the calcination temperature.

Figure 15:
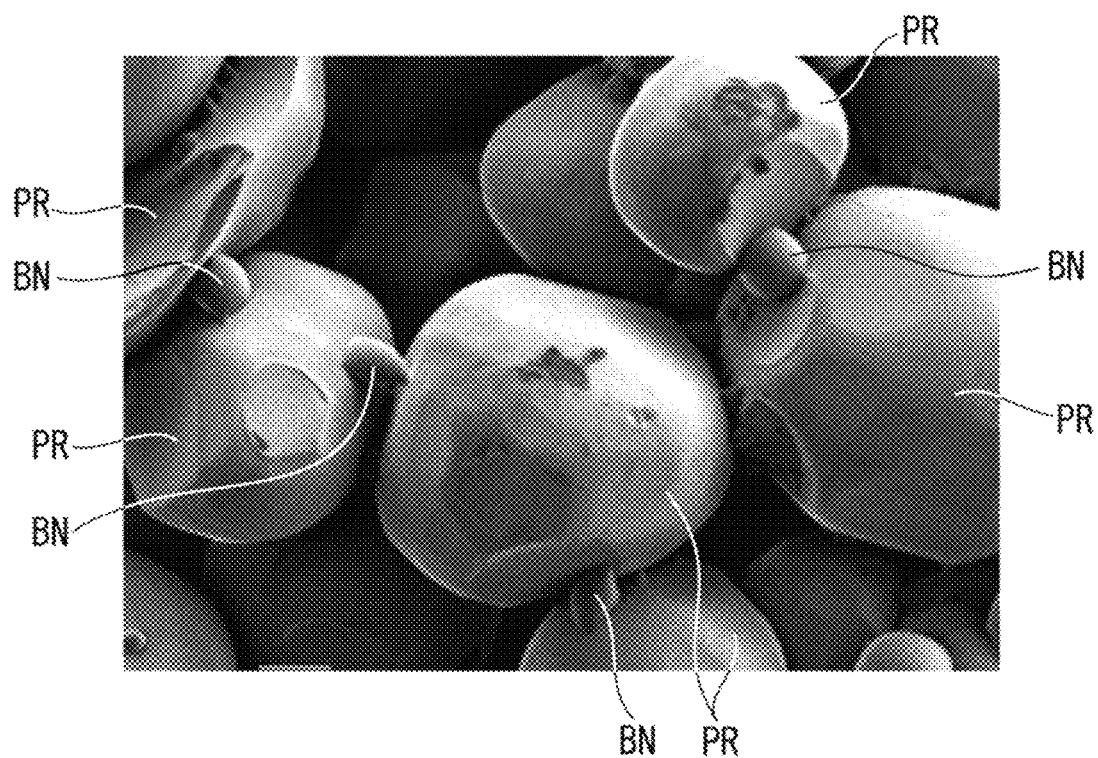
FIG. 15 is a diagram of an image showing a phosphor layer the glass content rate of which is 5 vol %, and which is formed at the calcination temperature of 750° C. in the embodiment.
Figure 16:
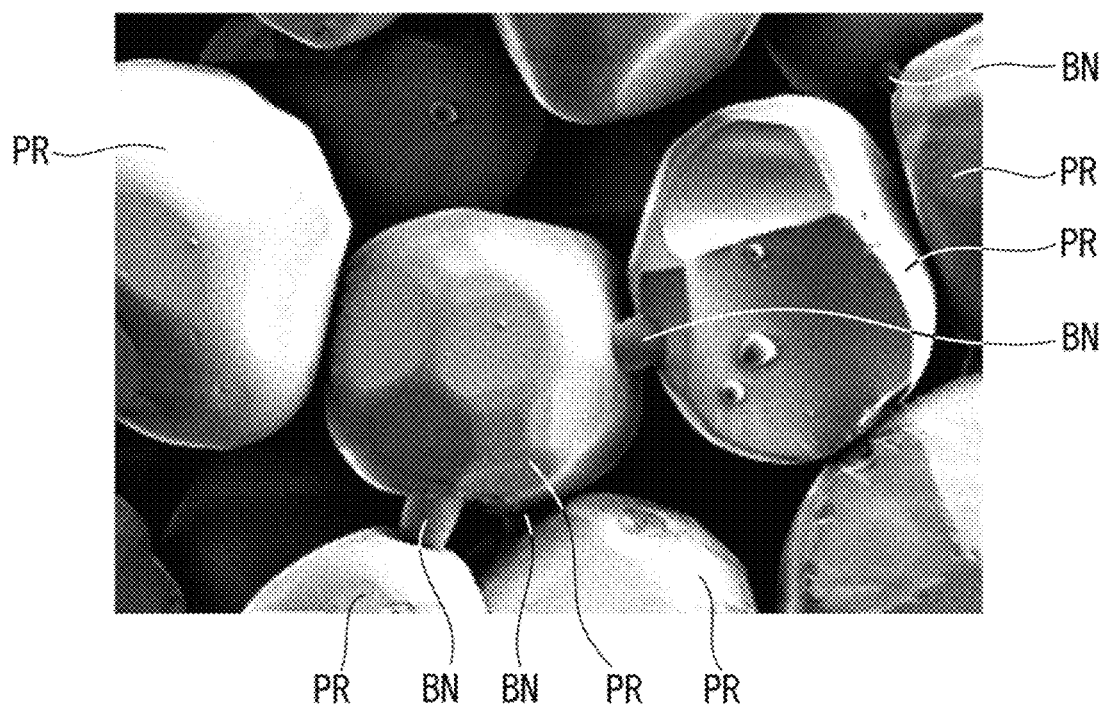
FIG. 16 is a diagram of an image showing a phosphor layer the glass content rate of which is 5 vol %, and which is formed at the calcination temperature of 800° C. in the embodiment.
Figure 17:
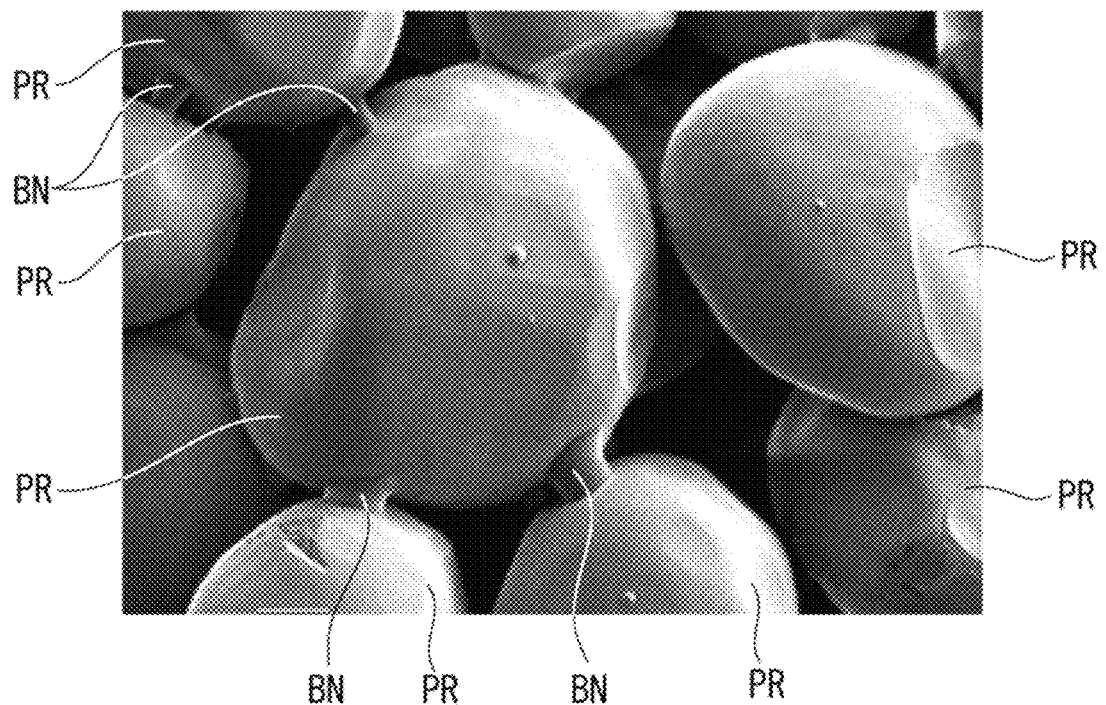
FIG. 17 is a diagram of an image showing a phosphor layer the glass content rate of which is 5 vol %, and which is formed at the calcination temperature of 850° C. in the embodiment.
Figure 18:
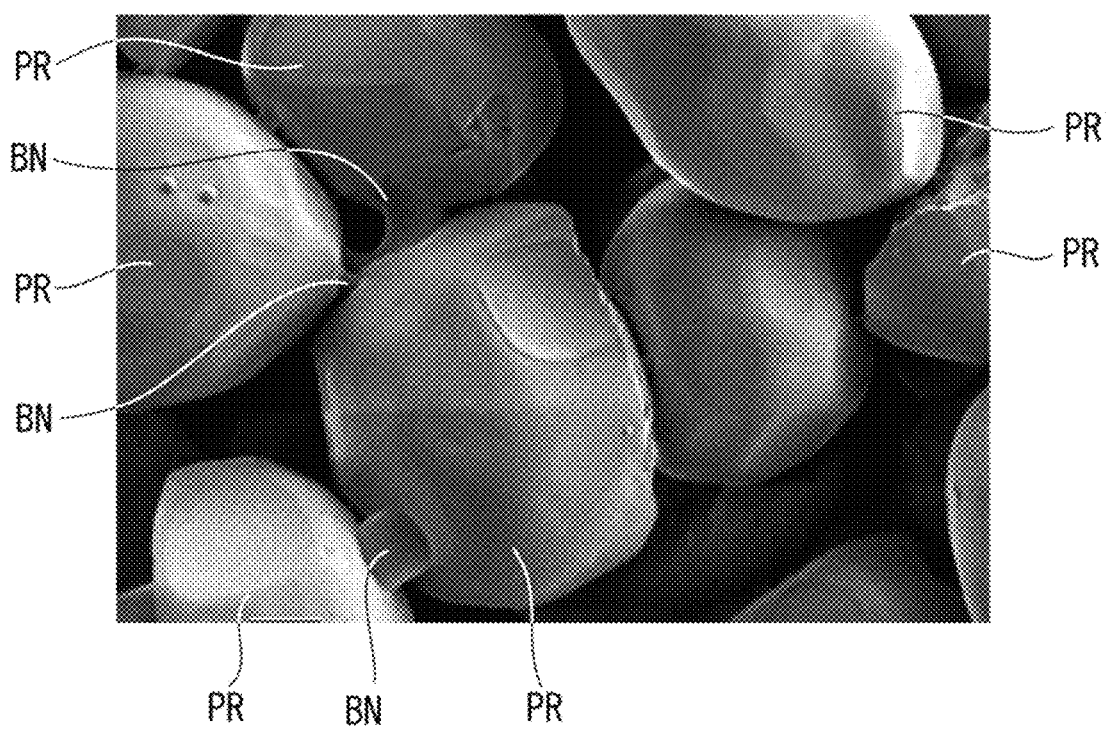
FIG. 18 is a diagram of an image showing a phosphor layer the glass content rate of which is 5 vol %, and which is formed at the calcination temperature of 900° C. in the embodiment.
Figure 19:
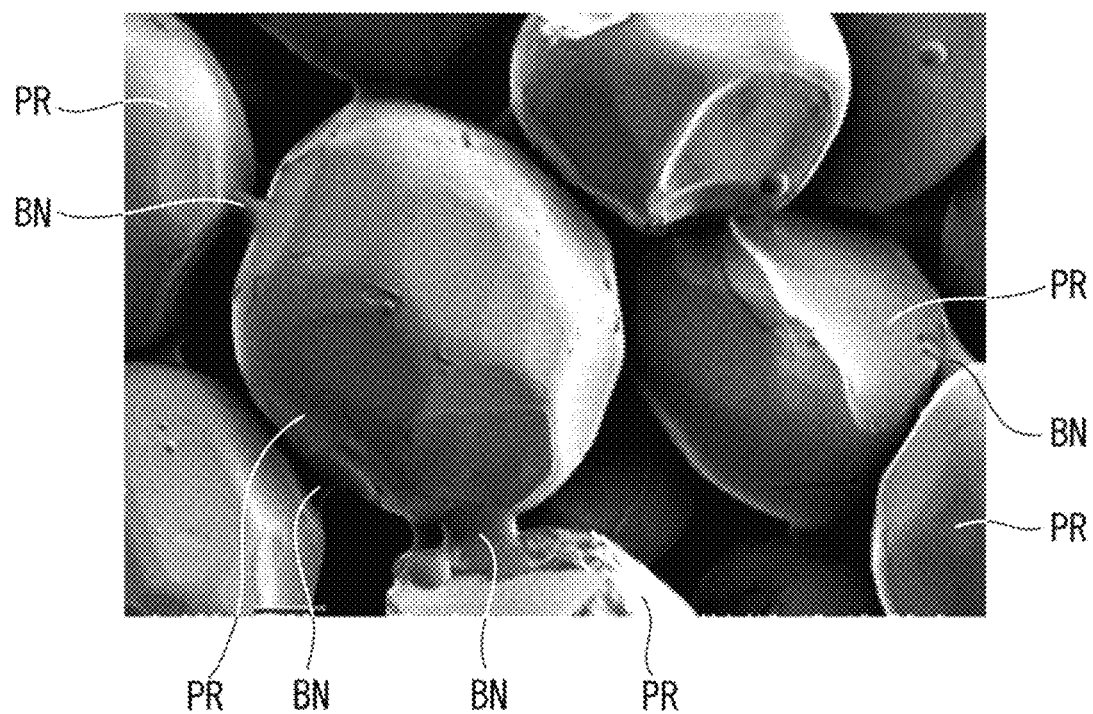
FIG. 19 is a diagram of an image showing a phosphor layer the glass content rate of which is 5 vol %, and which is formed at the calcination temperature of 950° C. in the embodiment.

In other words, FIG. 15 shows an SEM image showing a phosphor layer the glass content rate of which is 5 vol %, and which is manufactured by being calcined at 750° C. FIG. 16 shows an SEM image showing a phosphor layer the glass content rate of which is 5 vol %, and which is manufactured by being calcined at 800° C. FIG. 17 shows an SEM image showing a phosphor layer the glass content rate of which is 5 vol %, and which is manufactured by being calcined at 850° C. FIG. 18 shows an SEM image showing a phosphor layer the glass content rate of which is 5 vol %, and which is manufactured by being calcined at 900° C. FIG. 19 shows an SEM image showing a phosphor layer the glass content rate of which is 5 vol %, and which is manufactured by being calcined at 950° C.

It should be noted that FIG. 11 shows the SEM image of the phosphor layer the glass content rate of which is 5 vol %, and which is manufactured by being calcined at 1000° C. as described above.

In the phosphor layer calcined at 750° C. close to the softening point of the glass, the size of the binding part BP with respect to the diameter of the phosphor particle PR is substantially the same as described above as shown in FIG. 15. In other words, the size of the binding part BP with respect to the diameter of the phosphor particle PR is no larger than ¼ of the diameter of the phosphor particle PR. However, since the binder BN has a granular form, and in addition, the surface is not smooth, the fluorescence and the excitation light having entered the binder BN are apt to be scattered. When the scattering of the fluorescence and the excitation light increases, the light path length of the fluorescence increases, and when the light path length of the fluorescence increases, the intensity of the fluorescence decreases since the frequency of occurrence of the self-absorption by the phosphor particles increases, and the excitation light is reflected to the outside of the phosphor layer 53 without exciting the phosphor particles PR as described above.

Therefore, in the phosphor layer calcined at 750° C., the intensity of the fluorescence emitted from the phosphor layer decreases, and the optical system efficiency described above is apt to decrease.

In contrast, in the phosphor layer calcined at 800° C., the size of the binding part BP with the binder BN in the phosphor particle PR is substantially the same as described above as shown in FIG. 16. In other words, the size of the binding part BP with respect to the diameter of the phosphor particle PR is no larger than ¼ of the diameter of the phosphor particle PR. However, the size of the binding part BP in the phosphor layer calcined at 800° C. becomes smaller than the size of the binding part BP in the phosphor layer calcined at 750° C. Besides the above, since the calcination temperature is 100° C. higher than the softening point, and the viscosity is sufficiently low, the surface of the binder BN is made smooth, and the fluorescence having entered the binder BN is difficult to scatter. Further, as shown in FIG. 14, when the calcination temperature is 800° C., the viscosity of the glass becomes no higher than $10^6$ dPa·s (=$10^6$ P), and since the viscosity is sufficiently low, the surface of the binder BN is made smooth, and thus, the fluorescence having entered the binder BN is difficult to scatter. Therefore, the occurrence of the self-absorption by the phosphor particles PR is suppressed, and the intensity of the fluorescence is prevented from decreasing compared to the phosphor layer calcined at 750° C.

Substantially the same as above also applies to the phosphor layers calcined at 850° C., 900° C., and 950° C. shown in FIG. 17 through FIG. 19, respectively, and the phosphor layer calcined at 1000° C. shown in FIG. 11. In other words, since the viscosity of the glass decreases as the calcination temperature rises, the size of the binding part BP decreases, and in addition, the thickness of the binder BN as the dimension in the direction connecting the phosphor particles PR to be bound also decreases. Further, the surface of the binder BN in the phosphor layer becomes smoother, and the scattering of the fluorescence is further suppressed. It is conceivable that substantially the same is applied to a phosphor layer calcined at a temperature exceeding 1000° C.

In particular, when the calcination temperature becomes no higher than 900° C., the viscosity becomes no higher than $10^5$ dPa·s, the fluidity of the glass is enhanced, and the binder BN becomes in a state which is desirable from an optical point of view and a viewpoint of thermal conduction, and in which the binder BN has a streamline shape to bond the phosphor particles PR adjacent to each other. Further, it is understood from FIG. 11 that when the calcination temperature becomes 1000° C., the viscosity becomes $10^4$ dPa·s, and there is achieved the bonding state with near-complete fluidity.

On the other hand, when the calcination temperature in the calcination step S6 described above is made no lower than 1100° C., Ce ions as the activator agent of the phosphor are oxidized to thereby be deactivated. Therefore, from a viewpoint of the manufacturing process, it is more preferable for the calcination temperature in the calcination step S6 to be no lower than 800° C. and no higher than 1100° C. (100° C. or more and 400° C. or less higher than the softening point). Among the above, when the calcination temperature in the calcination step S6 is no lower than 900° C. and no higher than 1100° C. (200° C. or more and 400° C. or less higher than the softening point), the viscosity no higher than $10^3$ dPa·s can preferably be realized. Further, it is more desirable for the calcination temperature in the calcination step S6 to be no lower than 950° C. and no higher than 1050° C. (250° C. or more and 350° C. or less higher than the softening point). This is a temperature for realizing the viscosity of $10^4$ dPa·s, the phosphor layer is higher in emission efficiency, and the optical system efficiency described above including the optical device 30 is high.

Coupling between Holding Member and Phosphor Layer

Coupling between the holding member 52 and the phosphor layer 53 occurs in the cooling step S7 by cooling the binder BN in the process of cooling the calcination substance which is calcined in the calcination step S6 described above. In the cooling step S7, stress acts on the holding member 52 and the phosphor layer 53 due to a difference between the linear expansion coefficient of the borosilicate glass included in the binder BN and the linear expansion coefficient of the alumina substrate as the holding member 52. Such stress can damage the alumina substrate as the holding member 52.

Therefore, in the present embodiment, in order to prevent the damage of the alumina substrate as the holding member 52 to be provided with the pores, and at the same time, the alumina substrate as the holding member 52 to be coupled to the phosphor layer 53 with the binder BN, characteristics are set as follows. It should be noted that the data shown in FIG. 20 through FIG. 24 are obtained by making samples while changing the calcination temperature from 1300° C. to 1500° C. by 50° C. when performing the calcination after performing the press forming using alumina powder having an average particle diameter of 0.5 μm. Further, when cooling the glass included in the binder BN from a high temperature to the room temperature, the internal fluidity of the glass included in the binder BN decreases at an intermediate point (transition point) between a yield point and a distortion point, and predetermined stress obviously occurs between the glass included in the binder BN and the alumina substrate as the holding member 52. At a temperature no higher than the above, a variation in elastic modulus decreases, and the glass substantially included in the binder BN is fixed to the alumina substrate as the holding member 52 to exert an influence of the stress to each other.

Relationship Between Apparent Porosity and Bending Strength in Holding Member

Figure 20:
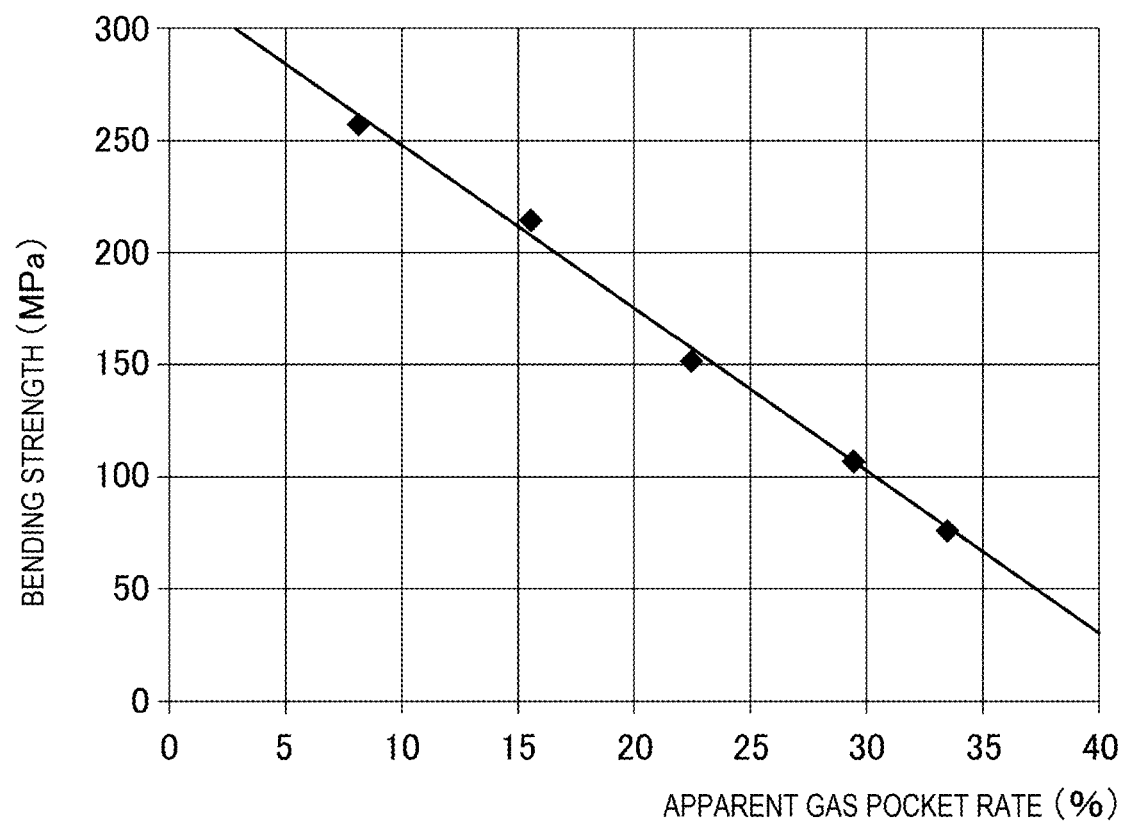
FIG. 20 is a graph showing a relationship between an apparent porosity and bending strength of a holding member in the embodiment.

FIG. 20 shows a graph of a relationship between an apparent porosity (in %) in the alumina substrate as the holding member 52 provided with the pores and bending strength (in MPa) of the alumina substrate as the holding member 52 provided with the pores obtained by an experiment.

The apparent porosity is a proportion of the volume of the space where water can infiltrate to the total volume of the alumina substrate as the holding member 52 provided with the pores, and the unit is "%." It should be noted that the apparent porosity is defined as {((mass of water–saturated specimen)–(mass of dry specimen))/((mass of water–saturated specimen)–(underwater mass of water-saturated specimen))}×100.

Further, the bending strength is a value of bending stress calculated based on the maximum load before a test piece is broken in a bending test, the unit is "MPa," and the bending strength is defined by JIS R1601.

In general, the reflection efficiency of the incident light in the alumina substrate as the holding member 52 provided with the pores increases as the apparent porosity of the alumina substrate increases. Therefore, as the holding member 52 for supporting the phosphor layer 53 and reflecting the light entering the holding member 52 from the phosphor layer 53, the alumina substrate high in apparent porosity can be adopted.

However, as shown in FIG. 20, when the apparent porosity of the alumina substrate as the holding member 52 provided with the pores increases, the bending strength of the alumina substrate as the holding member 52 provided with the pores linearly decreases. In other words, it was found out that the apparent porosity and the bending strength were in a negative proportional relation in the alumina substrate as the holding member 52 provided with the pores.

Defining the apparent porosity of the alumina substrate as the holding member 52 provided with the pores as X (in %), and the bending strength of the alumina substrate as the holding member 52 as A (in MPa), the bending strength A fulfills the formula (7) below.

$$A = -7.11X + 316.52 \tag{7}$$

Relationship Between Apparent Porosity and Elastic Modulus in Holding Member

Figure 21:
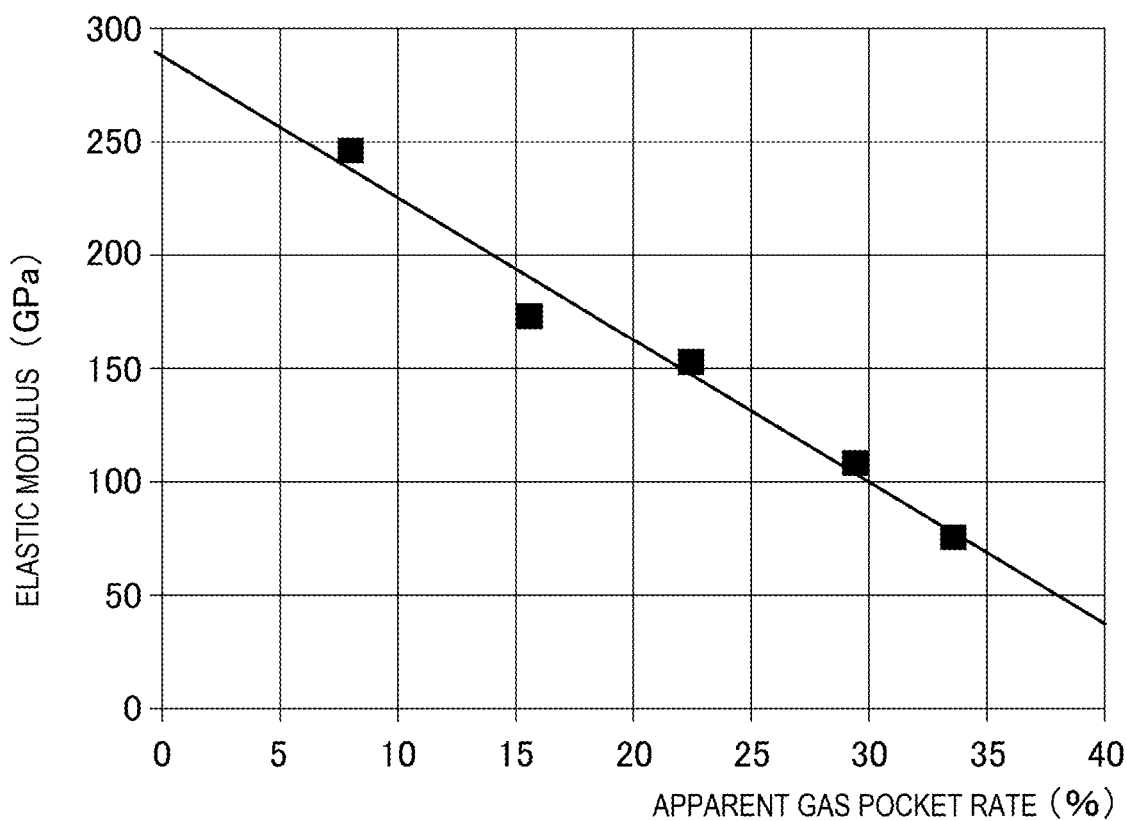
FIG. 21 is a graph showing a relationship between the apparent porosity and an elastic modulus of the holding member in the embodiment.

FIG. 21 shows a graph of a relationship between an apparent porosity (in %) in the alumina substrate as the holding member 52 provided with the pores and an elastic modulus (in GPa) of the alumina substrate as the holding member 52 provided with the pores obtained by an experiment.

The elastic modulus is a physicality value representing difficulty in deformation, and is a ratio between the stress and the distortion within an elastic range, and the unit is "GPa." In other words, the elastic modulus is a value obtained by dividing the maximum value of the displacement of the test piece by the load, and is defined by JIS R1602.

As shown in FIG. 21, when the apparent porosity of the alumina substrate as the holding member 52 provided with the pores increases, the elastic modulus of the alumina substrate as the holding member 52 provided with the pores linearly decreases. In other words, it was found out that the apparent porosity and the elastic modulus were in a negative proportional relation in the alumina substrate as the holding member 52 provided with the pores.

Defining the apparent porosity of the alumina substrate as the holding member 52 provided with the pores as X (in %), and the elastic modulus of the alumina substrate as the holding member 52 as B (in GPa), the elastic modulus B fulfills the formula (8) below.

$$B = -6.26X + 288.43 \tag{8}$$

As described above, in the alumina substrate as the holding member 52 provided with the pores, since the apparent porosity X (%) and the bending strength A (MPa) are in the negative proportional relation, and the apparent porosity X (%) and the elastic modulus B (GPa) are in the negative proportional relation, when increasing the apparent porosity in order to increase the reflection efficiency, the strength against the bending decreases, and at the same time, the deformation becomes easy in accordance with the stress. In other words, when increasing the apparent porosity, the alumina substrate as the holding member 52 provided with the pores becomes easy to deform, and easy to break. Therefore, as described above, there is a possibility that the alumina substrate as the holding member 52 provided with the pores is damaged by the stress generated between the alumina substrate and the phosphor layer 53 in the cooling step S7.

Figure 22:
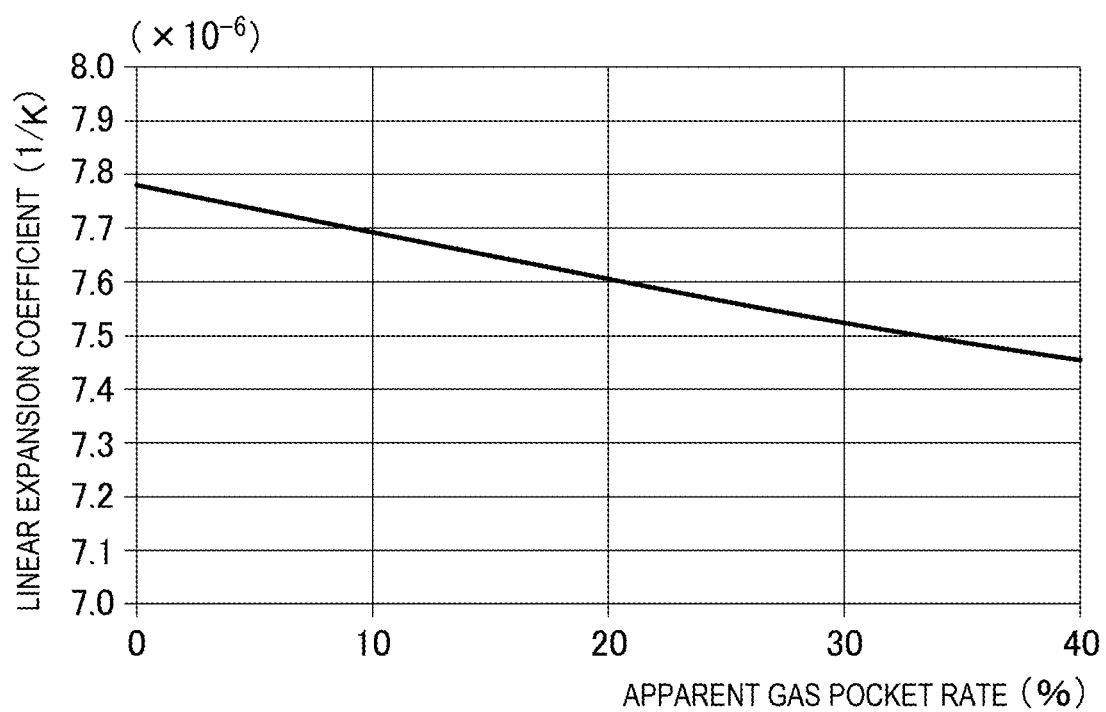
FIG. 22 is a graph showing a relationship between the apparent porosity and a linear expansion coefficient of the holding member in the embodiment.

Relationship Between Porosity and Linear Expansion Coefficient in Holding Member FIG. 22 shows a graph of a relationship between the apparent porosity and the linear expansion coefficient in the alumina substrate as the holding member 52 provided with the pores obtained by an experiment. The definition of the apparent porosity is substantially the same as described above.

It should be noted that the linear expansion coefficient is a ratio between an initial dimension of a molded component and a displacement due to the thermal expansion per temperature 1 K, and the unit is "1/K." It should be noted that the "linear expansion coefficient" in the present specification is a ratio to the displacement due to the thermal expansion per temperature 1 K in a predetermined temperature range. In other words, the "linear expansion coefficient" in the present specification means an average linear expansion coefficient. The "linear expansion coefficient" in the present specification does not mean an instantaneous linear expansion coefficient.

Further, as shown in FIG. 22, when the apparent porosity of the alumina substrate as the holding member 52 provided with the pores increases, the linear expansion coefficient of the alumina substrate as the holding member 52 provided with the pores linearly decreases. In other words, in the alumina substrate as the holding member 52 provided with the pores, the apparent porosity and the linear expansion coefficient are in the negative proportional relation, and when the apparent porosity increases, the deformation due to the heat decreases in the alumina substrate as the holding member 52 provided with the pores. However, in the alumina substrate as the holding member 52 provided with the pores, the variation in the linear expansion coefficient with respect to the variation in apparent porosity is not so large. In other words, in the alumina substrate as the holding member 52 provided with the pores, when the apparent porosity changes, the linear expansion coefficient does not significantly change.

Elastic Modulus and Linear Expansion Coefficient of Glass Included in Binder

The elastic modulus of the glass included in the binder BN is defined as C (in GPa). In the present experiment, borosilicate glass is used as the glass included in the binder BN. Therefore, the elastic modulus C (GPa) of the glass is about 70 GPa.

Further, when using borosilicate glass as the glass included in the binder BN, the linear expansion coefficient of borosilicate glass takes a substantially constant value of 5.6 in a range from the transition point to the room temperature.

It should be noted that the room temperature here is 20° C.±15° C. (5 through 35° C.) as stipulated in JIS Z8703.

Stress Generated in Holding Member and Stress Generated in Binder

When using borosilicate glass as the glass included in the binder BN, since the transition point is 500° C., and the elastic range of the glass is no higher than the transition point, when applying the glass on the alumina substrate as the holding member 52 provided with the pores, the stress due to a difference between the linear expansion coefficient of the alumina substrate and the linear expansion coefficient of the glass is generated in the alumina substrate and the glass in the process in which the temperature drops from the transition point to the room temperature. Specifically, in the alumina substrate, since the linear expansion coefficient is high, there occurs tensile stress in an opposite direction to the extension direction. Further, during the period in which the temperature of the calcination substance drops from 500° C. as the transition point of borosilicate glass to the room temperature, when the magnitude of the stress exceeds the bending strength A (MPa), there is a possibility that the alumina substrate is damaged. It should be noted that it is conceivable that the glass is not damaged since the stress acts on the glass is compression stress.

Therefore, defining the apparent porosity of the alumina substrate as the holding member 52 provided with the pores as X (%), the bending strength A (MPa) of the alumina substrate is expressed as the formula (7) described above.

A total of the distortion of the alumina substrate and the distortion of the glass included in the binder BN when the stress corresponding to the bending strength A (MPa) of the alumina substrate expressed by the formula (7) is generated is a value obtained by multiplying a sum of the reciprocal of the elastic modulus B (GPa) of the alumina substrate and the reciprocal of the elastic modulus of the glass included in the binder BN by the bending strength A (MPa) of the alumina substrate.

It should be noted that the elastic modulus B (GPa) of the alumina substrate is expressed as the formula (8) described above.

Further, the elastic modulus of the glass included in the binder BN is defined as C (in GPa).

Therefore, when a value expressed as $(A \times (1/B + 1/C) \times 0.001)$ becomes equal to an accumulated value of a difference between the linear expansion coefficient of the alumina substrate as the holding member 52 provided with the pores and the linear expansion coefficient of the glass included in the binder BN when the temperature changes from the transition point of the glass to the room temperature, a breakage of the alumina substrate occurs.

Relationship Between Apparent Porosity and Distortion in Holding Member

Figure 23:
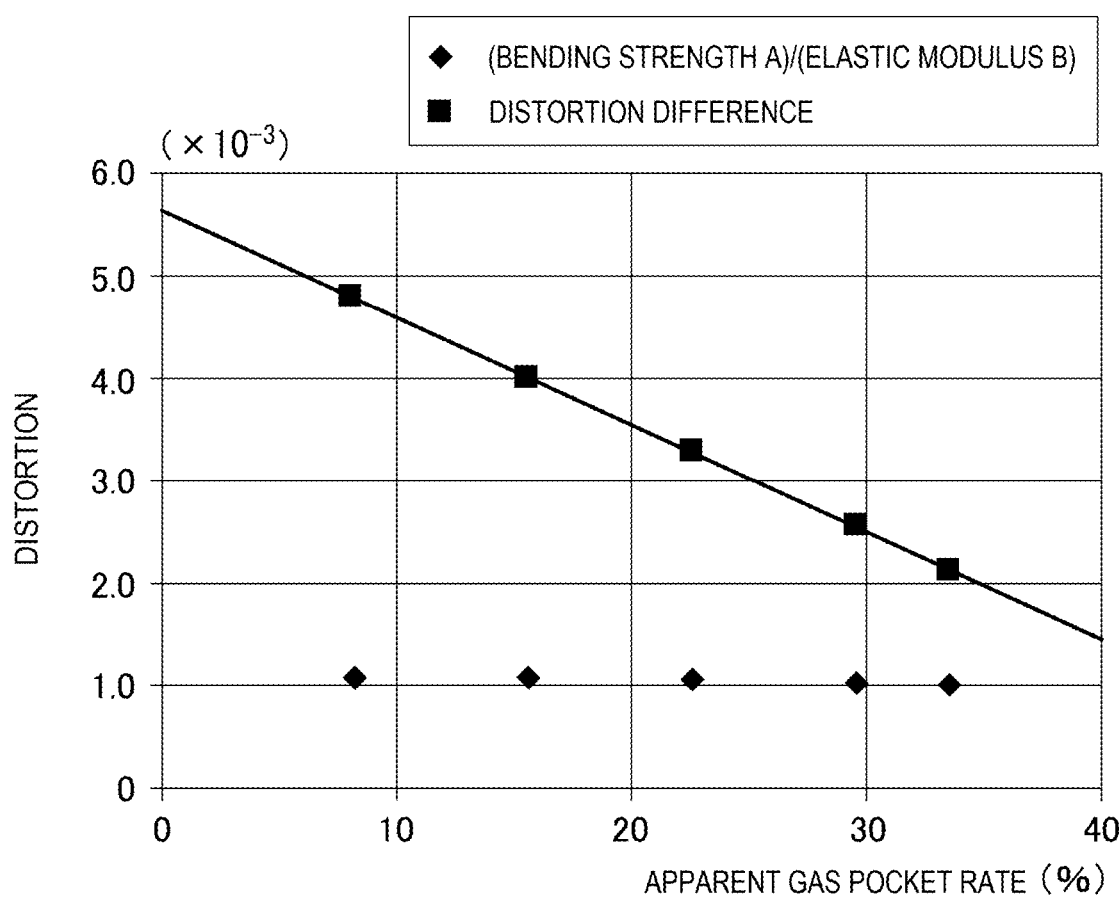
FIG. 23 is a graph showing a relationship between the apparent porosity and a distortion of the holding member in the embodiment.

FIG. 23 shows a graph representing a relationship between the apparent porosity X (%) and the distortion in the alumina substrate as the holding member 52 provided with the pores.

The inventors obtained (bending strength A (MPa))/(elastic modulus B (GPa)) with respect to the apparent porosity X (%) of the alumina substrate as the holding member 52 provided with the pores from FIG. 20 and FIG. 21. It should be noted that the bending strength A (MPa) with respect to the apparent porosity X (%) of the alumina substrate is expressed as the formula (7) described above. Further, the elastic modulus B (GPa) with respect to the apparent porosity X (%) of the alumina substrate is expressed as the formula (8) described above. Therefore, the value (bending strength A (MPa))/(elastic modulus B (GPa)) shown in FIG. 23 represents the distortion when the alumina substrate is damaged.

Further, the inventors obtained a distortion difference as shown in FIG. 23. The distortion difference means a difference in distortion due to a difference in linear expansion coefficient between the alumina substrate and the glass in a range from the transition point of the glass to the room temperature. It should be noted that the elastic modulus C (GPa) of the glass included in the binder BN is about 70 GPa.

For example, as shown in FIG. 23, when the apparent porosity X (%) of the alumina substrate is 20%, the value obtained by multiplying the distortion difference by the transition point of the glass makes about 0.0036. When dividing the value by 500° C., the transition point of the glass, there is obtained $7.2 \times 10^{-6}$ which is a value sufficiently greater than $2.0 \times 10^{-6}$, the difference in linear expansion coefficient between the alumina substrate and the glass used in the experiment. It should be noted that as described above, the transition point of borosilicate glass is 500° C.

Here, when the alumina substrate as the holding member 52 provided with the pores and the glass included in the binder BN are bonded to each other, there occurs the distortion due to the difference between the linear expansion coefficient of the alumina substrate and the linear expansion coefficient of the glass. Due to the distortion, there is generated the stress. Therefore, the distortion is shared by the alumina substrate and the glass in inverse proportion to the elastic modulus of the alumina substrate and the elastic modulus of the glass.

In other words, the distortion reciprocal to the elastic modulus B (GPa) of the alumina substrate is generated in the alumina substrate, and the distortion reciprocal to the elastic modulus C (GPa) of the glass is generated in the glass. This shows the fact that the sum of the respective reciprocals represents the total distortion of the distortion of the alumina substrate and the distortion of the glass.

In view of the consideration described above, the inventors found out the fact that the damage of the alumina substrate, namely the holding member 52 after the calcination is prevented by fulfilling the formula (9) below when the linear expansion coefficient of the glass is smaller than the linear expansion coefficient of the holding member 52 in the temperature range from the transition point of the glass to the room temperature defining the apparent porosity of the alumina substrate as the holding member 52 provided with the pores as X (%), the bending strength of the holding member 52 as A (MPa), the elastic modulus of the holding member 52 as B (GPa), the elastic modulus of the glass as C (GPa), a product of the difference between the linear expansion coefficient of the holding member 52 and the linear expansion coefficient of the glass included in the binder BN and the transition point of the glass included in the binder BN as Y. It should be noted that the bending strength A (MPa) of the alumina substrate is expressed as the formula (7) described above. Further, the elastic modulus B (GPa) of the alumina substrate is expressed as the formula (8) described above.

$$Y < A \times (1/B + 1/C) \times 0.001 \qquad (9)$$

The formula (9) is expressed as a graph in FIG. 23 assuming the elastic modulus C of the glass as 70 GPa. In FIG. 23, the graph corresponding to the formula (9) is represented by the solid line.

Here, defining (1/B+1/C) as D, the formula (9) is expressed as the formula (10) below.

$$Y < A \times D \times 0.001 \qquad (10)$$

It should be noted that when substituting the formula (7) and the formula (8) into the formula (9) to express the value Y with the apparent porosity X (%) of the alumina substrate as the holding member 52 provided with the pores and the elastic modulus C (GPa) of the glass, the formula (11) described below is obtained.

$$Y < (-7.11X + 316.52) \times (1/(-6.26X + 288.43) + 1/C) \times 0.001 \qquad (11)$$

Here, the relationship represented by the formula (11) was obtained using the test piece described above. Therefore, in an ordinary usage of the product, under constraints of defects and the shape in the alumina substrate as the holding member 52 provided with the pores, it is preferable to adopt a relationship between the expected stress and the bending strength A (MPa) of the alumina substrate in which the bending strength is twice through three times as high as the assumed stress damaging the alumina substrate.

In other words, it is more preferable to fulfill the following formula (12) in which the bending strength A (MPa) of the alumina substrate is twice as high as the assumed stress, and it is further more preferable to fulfill the following formula (13) in which the bending strength of the alumina substrate is three times as high as the assumed stress. Thus, it is possible to prevent the holding member 52 for supporting the phosphor layer 53 and formed of the alumina substrate from being damaged in the cooling step S7 described above.

$$Y < (-3.56X + 158.26) \times (1/(-6.26X + 288.43) + 1/C) \times 0.001 \qquad (12)$$

$$Y < (-2.37X + 105.51) \times (1/(-6.26X + 288.43) + 1/C) \times 0.001 \qquad (13)$$

By setting the apparent porosity and the linear expansion coefficient of the alumina substrate as the holding member 52 provided with the pores, and the linear expansion coefficient and the transition point of the glass for coupling the holding member 52 and the phosphor layer 53 to each other in the manufacturing method described above so as to fulfill at least one of the formulas (9) through (13) described above, it is possible to prevent the damage of the holding member 52 in the wavelength conversion element 51 to be manufactured.

Further, by setting the apparent porosity X (%), the bending strength A (MPa), the elastic modulus B (GPa), and the linear expansion coefficient of the holding member 52, and the elastic modulus C (GPa), the linear expansion coefficient, and the transition point of the glass included in the binder BN so as to make the value of Y smaller than the value of the product of the value A described above, the value D described above, and 0.001, it is possible to prevent the alumina substrate as the holding member 52 from being damaged by the stress applied to the alumina substrate as the holding member 52.

Figure 24:
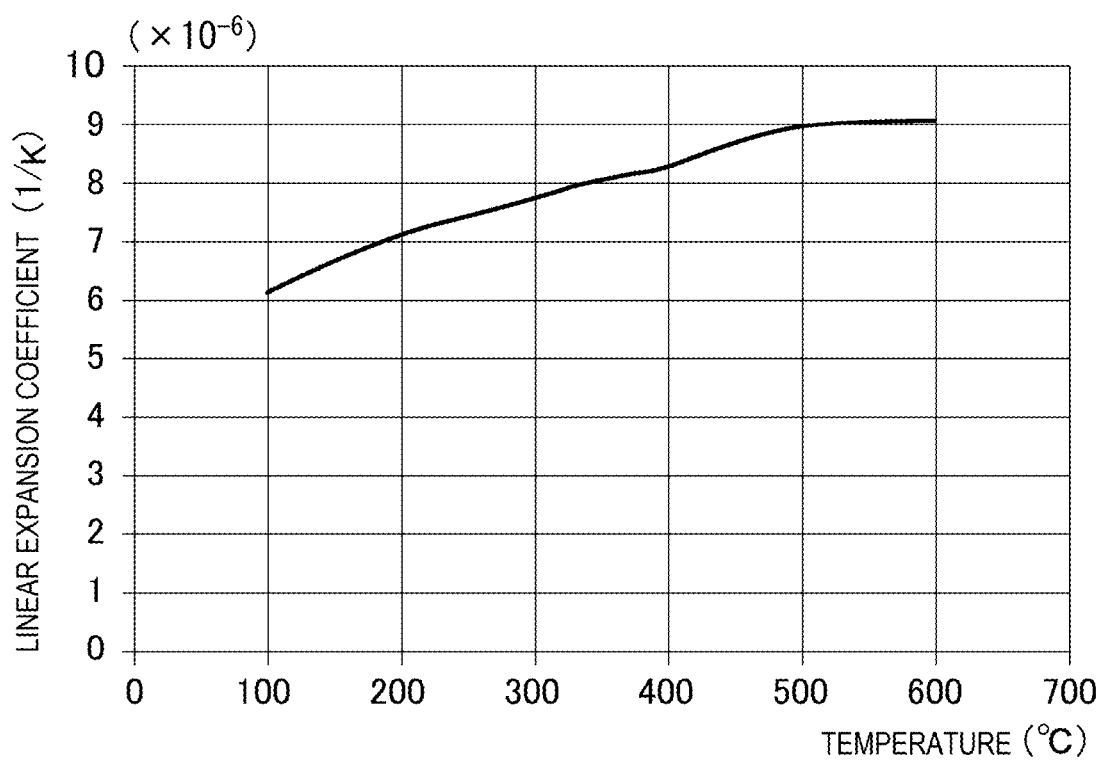
FIG. 24 is a graph showing a relationship between the temperature and the linear expansion coefficient of the holding member in the embodiment.

Relationship Between Temperature and Linear Expansion Coefficient in Holding Member FIG. 24 shows a graph representing a relationship between the temperature and the linear expansion coefficient when the apparent porosity is 16% in the alumina substrate as the holding member 52 provided with the pores.

In a range from 100° C. and no higher than 600° C., the linear expansion coefficient linearly increases from about $6.0 \times 10^{-6}$ to $9.0 \times 10^{-6}$. In a range in which the linear expansion coefficient changes from about $6.0 \times 10^{-6}$ to $9.0 \times 10^{-6}$, an average value of the linear expansion coefficient is about $7.5 \times 10^{-6}$.

In contrast, the linear expansion coefficient of the glass included in the binder BN takes substantially the same value in a range from the room temperature to the transition point. It should be noted that when the temperature of the glass included in the binder BN becomes higher than the transition point, the linear expansion coefficient of the glass increases at a steep gradient until reaching the yield point. However, during the period in which the temperature of the glass included in the binder BN changes from the transition point to reach the yield point, since the elastic modulus of the glass included in the binder BN decreases, and the difference between the linear expansion coefficient of the alumina substrate as the holding member 52 provided with the pores and the linear expansion coefficient of the glass included in the binder BN decreases, the linear expansion coefficient of the glass included in the binder BN does not affect the damage of the alumina substrate as the holding member 52 provided with the pores in the period until reaching the room temperature.

Advantages of Embodiment

According to a process of manufacturing the projector 1 and the wavelength conversion element 51 related to the present embodiment described hereinabove, the following advantages can be exerted.

The projector 1 is provided with the light source device 4, the light modulation devices 343 (343B, 343G, and 343R) for modulating the light emitted from the light source device 4 in accordance with the image information, and the projection optical device 36 for projecting the light modulated by the light modulation devices 343. The light source device 4 is provided with the light source 411 for emitting the excitation light, and the wavelength conversion element 51 for performing the wavelength conversion on the excitation light to generate the fluorescence having a longer wavelength than the wavelength of the excitation light.

The wavelength conversion element 51 is provided with the phosphor layer 53 having the plurality of phosphor particles PR, and the binder BN for binding one (PR1) of the phosphor particles PR adjacent to each other and the other (PR2) of the phosphor particles PR adjacent to each other out of the plurality of phosphor particles PR, and the holding member 52 including the alumina and holding the phosphor layer 53. The binder BN includes the glass, and the binder BN binds a part of the surface of the one phosphor particle PR (PR1) and a part of the surface of the other phosphor particle PR (PR2) to each other. Further, the alumina substrate as the holding member 52 is provided with the pores.

Further, defining the apparent porosity of the holding member 52 as X (in %), and the bending strength of the holding member 52 as A (in MPa), the bending strength A fulfills the formula (7) described above.

Further, defining the elastic modulus of the holding member 52 as B (in GPa), the elastic modulus B fulfills the formula (8) described above.

Defining the elastic modulus of the glass as C (in GPa), the sum of the reciprocal of the elastic modulus B and the reciprocal of the elastic modulus C as D, and the product of the difference between the linear expansion coefficient of the holding member 52 and the linear expansion coefficient of the glass included in the binder BN and the transition point of the glass included in the binder BN as Y, in a temperature range from the transition point of the glass to the room temperature, the value of Y is smaller than the value of the product of the bending strength A, the sum D, and 0.001 when the linear expansion coefficient of the glass is smaller than the linear expansion coefficient of the holding member 52.

According to such a configuration, the binder BN is not bonded to the entire surface of each of the phosphor particles PR, but is bonded to only a part of the surface in each of the phosphor particles PR. This makes it possible to reduce the area of the binding part BP to be bonded to the binder BN in the surface of the phosphor particle PR. In other words, it is possible to increase the area of the region having contact with the void (air) in the surface of the phosphor particle PR. Thus, since it is possible to decrease the intensity of the fluorescence propagating the binder BN, it is possible to decrease the spread of the light emitted from the phosphor layer 53, and by extension, from the wavelength conversion element 51. Therefore, it is possible to enhance the brightness in the optical device 30 as the optical system, and thus, it is possible to increase the optical system efficiency described above.

Further, by setting the apparent porosity X (%), the bending strength A (MPa), the elastic modulus B (GPa), and the linear expansion coefficient of the holding member 52, and the elastic modulus C (GPa), the linear expansion coefficient, and the transition point of the glass included in the binder BN so as to make the value of Y smaller than the value of the product of the value A described above, the value D described above, and 0.001, it is possible to prevent the alumina substrate as the holding member 52 from being damaged by the stress applied to the alumina substrate as the holding member 52.

Therefore, since it is possible to stably emit the fluorescence from the wavelength conversion element 51, and further, it is possible to stably emit the illumination light from the light source device 4, it is possible to stably perform the image projection by the projector 1.

When manufacturing the phosphor layer 53, the proportion of the volume of the binder BN to the total volume of the sum of the volumes of the phosphor particles PR and the sum of the volumes of the binder BN is larger than 0 vol % and no larger than 10 vol %. In other words, the glass content rate in the mixture paste prepared when manufacturing the phosphor layer 53 is larger than 0 vol % and no larger than 10 vol %.

According to such a configuration, as described above, it is possible to reduce the area of the binding part BP to be bonded to the binder BN in the surface of the phosphor particle PR. Thus, it is possible to decrease the intensity of the fluorescence propagating inside the binder BN, and it is possible to decrease the spread of the fluorescence emitted from the phosphor layer 53, and by extension, from the wavelength conversion element 51. Therefore, it is possible to enhance the brightness in the optical device 30 as the optical system, and thus, it is possible to increase the optical system efficiency described above.

The method of manufacturing the wavelength conversion element 51 includes the paste preparation step S1 and the phosphor mixing step S2 as the preparation step for preparing the mixture paste as the mixture obtained by mixing the binder BN including the glass and the phosphor particles PR with each other, the coating step S4 for applying the mixture paste on the alumina substrate to turn to the holding member 52, and the calcination step S6 for calcining the mixture paste. Further, the calcination temperature in the calcination step S6 is 100° C. or more higher than the softening point of the glass included in the binder BN. Further, the alumina substrate as the holding member 52 is provided with the pores.

Further, defining the apparent porosity of the holding member 52 as X (in %), and the bending strength of the holding member 52 as A (in MPa), the bending strength A fulfills the formula (7) described above.

Further, defining the elastic modulus of the holding member as B (in GPa), the elastic modulus B fulfills the formula (8) described above.

Defining the elastic modulus of the glass as C (in GPa), the sum of the reciprocal of the elastic modulus B and the reciprocal of the elastic modulus C as D, and the product of the difference between the linear expansion coefficient of the holding member 52 and the linear expansion coefficient of the glass included in the binder BN and the transition point of the glass included in the binder BN as Y, in a temperature range from the transition point of the glass to the room temperature, the value of Y is smaller than the value of the product of the bending strength A, the sum D, and 0.001 when the linear expansion coefficient of the glass is smaller than the linear expansion coefficient of the holding member 52. It should be noted that in the example described above, the borosilicate glass is used as the glass.

According to such a manufacturing method, it is possible to manufacture the wavelength conversion element 51 having the phosphor layer 53 in which the proportion of the area of the binding part BP to the surface area of the phosphor particle PR is no higher than 10%, and the dimensions in the X axis and the Y axis of the binding part BP are no larger than ¼ of the diameter of the phosphor particle PR. Therefore, it is possible to prevent the scattering of the fluorescence having entered the binder BN, and in addition, it is possible to prevent the self-absorption by the phosphor particles PR from occurring, and thus, it is possible to manufacture the wavelength conversion element 51 in which a decrease in intensity of the fluorescence is suppressed.

Further, by the light source device 4 being provided with such a wavelength conversion element 51, it is possible to configure the light source device 4 capable of increasing the optical system efficiency as the light use efficiency in the optical device 30.

Further, by setting the apparent porosity X (%), the bending strength A (MPa), the elastic modulus B (GPa), and the linear expansion coefficient of the holding member 52, and the elastic modulus C (GPa), the linear expansion coefficient, and the transition point of the glass included in the binder BN so as to make the value of Y smaller than the value of the product of the value A described above, the value D described above, and 0.001, it is possible to prevent the alumina substrate as the holding member 52 from being damaged by the stress applied to the alumina substrate as the holding member 52. Therefore, it is possible to stably emit the fluorescence from the wavelength conversion element 51.

The method of manufacturing the wavelength conversion element 51 includes the paste preparation step S1 and the phosphor mixing step S2 as the preparation step for preparing the mixture paste as the mixture obtained by mixing the binder BN including the glass and the phosphor particles PR with each other, the coating step S4 for applying the mixture paste on the holding member 52, and the calcination step S6 for calcining the mixture paste. The viscosity of the glass in the calcination step S6 is no higher than $10^6$ dPa·s. Further, the alumina substrate as the holding member 52 is provided with the pores.

Further, defining the apparent porosity of the holding member 52 as X (in %), and the bending strength of the holding member 52 as A (in MPa), the bending strength A fulfills the formula (7) described above.

Further, defining the elastic modulus of the holding member 52 as B (in GPa), the elastic modulus B fulfills the formula (8) described above.

Defining the elastic modulus of the glass as C (in GPa), the sum of the reciprocal of the elastic modulus B and the reciprocal of the elastic modulus C as D, and the product of the difference between the linear expansion coefficient of the holding member 52 and the linear expansion coefficient of the glass included in the binder BN and the transition point of the glass included in the binder BN as Y, in a temperature range from the transition point of the glass to the room temperature, the value of Y is smaller than the value of the product of the bending strength A, the sum D, and 0.001 when the linear expansion coefficient of the glass is smaller than the linear expansion coefficient of the holding member 52. It should be noted that in the example described above, the borosilicate glass is used as the glass.

According to such a manufacturing method, it is possible to manufacture the wavelength conversion element 51 having the phosphor layer 53 in which the proportion of the area of the binding part BP to the surface area of the phosphor particle PR is no higher than 10%, and the dimensions in the X axis and the Y axis of the binding part BP are no larger than ¼ of the diameter of the phosphor particle PR similarly to when setting the calcination temperature of the mixture paste in the calcination step S6 to the temperature 100° C. or more higher than the softening point of the glass. Therefore, it is possible to prevent the scattering of the fluorescence having entered the binder BN, and in addition, it is possible to prevent the self-absorption by the phosphor particles PR from occurring, and thus, it is possible to manufacture the wavelength conversion element 51 in which a decrease in intensity of the fluorescence is suppressed. Further, by the light source device 4 being provided with such a wavelength conversion element 51, it is possible to configure the light source device 4 capable of increasing the optical system efficiency as the light use efficiency in the optical device 30.

Further, by setting the apparent porosity X (%), the bending strength A (MPa), the elastic modulus B (GPa), and the linear expansion coefficient of the holding member 52, and the elastic modulus C (GPa), the linear expansion coefficient, and the transition point of the glass included in the binder BN so as to make the value of Y smaller than the value of the product of the value A described above, the value D described above, and 0.001, it is possible to prevent the alumina substrate as the holding member 52 from being damaged by the stress applied to the alumina substrate as the holding member 52. Therefore, it is possible to stably emit the fluorescence from the wavelength conversion element 51.

Modifications of Embodiment

The present disclosure is not limited to the embodiment described above, but includes modifications, improvements, and so on in the range where the advantages of the present disclosure can be achieved.

In the embodiment described above, it is assumed that the dimension in the X axis of the binding part BP to be bonded to the binder BN in the surface of the phosphor particle PR is no larger than ¼ of the diameter of the phosphor particle PR, and the dimension in the Y axis of the binding part BP is no larger than ¼ of the diameter of the phosphor particle PR. However, this is not a limitation, and the size of the binding part BP is not limited to the above providing the proportion of the area of the binding part BP to the surface area of the phosphor particle PR becomes a value no higher than 10%, and preferably becomes a value no lower than 3% and no higher than 5%. Further, even when the dimension in the X axis and the dimension in the Y axis of the binding part BP each fail to be no larger than ¼ of the diameter of the phosphor particle PR, providing the proportion of the area of the binding part BP to the surface area of the phosphor particle PR becomes a value no higher than 10%, or preferably becomes a value no lower than 3% and no higher than 5%, it is possible for the dimension in one of the axes to exceed ¼ of the diameter of the phosphor particle PR.

In the embodiment described above, it is assumed that the glass content rate of the phosphor layer 53 is higher than 0 vol % and no higher than 10 vol %. In other words, it is assumed that the proportion of the volume of the binder BN to the total volume of the sum of the volumes of the phosphor particles PR and the sum of the volumes of the binder BN is larger than 0 vol % and no larger than 10 vol %. However, this is not a limitation, and the proportion of the volume can exceed 10 vol % within a range in which it is determined that the optical system efficiency is sufficiently high. It should be noted that the proportion of the volume is a value when manufacturing the phosphor layer 53 as described above.

In the embodiment described above, it is assumed that the method of manufacturing the wavelength conversion element 51 includes the paste preparation step S1, the phosphor mixing step S2, the printing plate forming step S3, the coating step S4, the drying step S5, the calcination step S6, and the cooling step S7. However, this is not a limitation, and any of the steps S1 through S7 can be eliminated. For example, the drying step S5 can be eliminated. Further, the paste preparation step S1 and the phosphor mixing step S2 can be executed at the same time.

In the embodiment described above, it is assumed that the viscosity of the glass in the calcination step S6 is a value no higher than $10^6$ dPa·s. In other words, it is assumed that the calcination temperature is made 100° C. or more higher than the softening point of the glass so that the viscosity of the glass takes a value no higher than $10^6$ dPa·s. However, this is not a limitation, and the calcination temperature is not required to be 100° C. or more higher than the softening point of the glass to be the binder BN providing the viscosity of the glass takes a value no higher than $10^6$ dPa·s. In contrast, when the calcination temperature is 100° C. or more higher than the softening point of the glass, the viscosity of the glass to be the binder BN is not required to be no higher than $10^6$ dPa·s in the calcination step S6. In other words, it is sufficient to satisfy at least either one of the fact that the calcination temperature is 100° C. or more higher than the softening point of the glass, and the fact that the viscosity of the glass is no higher than $10^6$ dPa·s in the calcination step S6.

In the embodiment described above, there is illustrated the reflective wavelength conversion element 51 in which the phosphor layer 53 is located on the incident side of the excitation light with respect to the holding member 52, and the fluorescence is emitted on the incident side of the excitation light. However, this is not a limitation, and it is also possible to apply the present disclosure to a transmissive wavelength conversion element for emitting the fluorescence along the incident direction of the excitation light. In the case of the transmissive wavelength conversion element, sapphire is preferably used as the substrate.

In the embodiment described above, it is assumed that the phosphor layer 53 is directly held by the holding member 52. However, this is not a limitation, a dielectric multilayer film for reflecting the light emitted from the phosphor layer 53 can also be disposed between the phosphor layer 53 and the holding member 52.

In the embodiment described above, it is assumed that the wavelength conversion element 51 has the configuration of being rotated by the rotary section RT. However, this is not a limitation, and it is also possible to adopt a configuration in which the wavelength conversion element is not rotated. In other words, the wavelength conversion device is not required to be provided with the rotary section RT for rotating the wavelength conversion element. In this case, the phosphor layer 53 is not required to be formed to have an annular shape when viewed from the incident side of the excitation light, and can also be formed to have, for example, a circular shape or a polygonal shape. Further, the shape of the phosphor layer 53 can also be a circular shape or a polygonal shape when viewed from the incident side of the excitation light irrespective of whether or not the phosphor layer 53 is rotated.

In the embodiment described above, it is assumed that the projector 1 is equipped with the three light modulation devices 343 (343B, 343G, and 343R). However, this is not a limitation, and the present disclosure can also be applied to a projector equipped with two or less, or four or more light modulation devices.

In the embodiment described above, it is assumed that the projector 1 is provided with the light modulation devices 343 each having the transmissive type liquid crystal panel having the plane of incidence of light and the light emission surface different from each other. However, this is not a limitation, but it is also possible to adopt a configuration in which the light modulation devices each have a reflective type liquid crystal panel having the plane of incidence of light and the light emission surface coinciding with each other. Further, it is also possible to use a light modulation device other than the liquid crystal device such as a device using a micromirror such as a digital micromirror device (DMD) providing the light modulation device is capable of modulating the incident light beam to form the image corresponding to the image information.

In the embodiment described above, there is cited an example in which the light source device 4 is applied to the projector 1. However, this is not a limitation, and it is also possible for the light source device according to the present disclosure to be adopted in, for example, lighting equipment, and a spotlight or the like of a vehicle or the like. Further, the light source device according to the present disclosure is not limited to the configuration of the light source device 4, and providing the light source device has a configuration provided with the wavelength conversion element and the light source for emitting the light which enters the wavelength conversion element, other components constituting the light source device can arbitrarily be changed. Substantially the same is applied to the projector according to the present disclosure.

What is claimed is:

1. A wavelength conversion element comprising:
   a phosphor layer having a plurality of phosphor particles and a binder configured to bind one of the phosphor particles adjacent to each other and another of the phosphor particles adjacent to each other out of the plurality of phosphor particles; and
   a holding member including alumina and configured to hold the phosphor layer, wherein
   the binder includes glass,
   the binder binds a part of a surface of the one of the phosphor particles and a part of a surface of the another of the phosphor particles to each other,
   the holding member is provided with a pore,
   defining an apparent porosity of the holding member as X expressed in terms of %,
   defining bending strength of the holding member as A expressed in terms of MPa, A fulfills a formula (1) below,
   defining an elastic modulus of the holding member as B expressed in terms of GPa, B fulfills a formula (2) below, and
   defining an elastic modulus of the glass as C expressed in terms of GPa,
   defining a sum of a reciprocal of B and a reciprocal of C as D,
   defining a product of a difference between a linear expansion coefficient of the holding member and a linear expansion coefficient of the glass and a transition point of the glass as Y,
   a value of Y is smaller than a value of a product of A, D, and 0.001 when the linear expansion coefficient of the glass is smaller than the linear expansion coefficient of the holding member in a temperature range from the transition point of the glass to a room temperature $$A = -7.11X + 316.52 \tag{1}$$

$$B = -6.26X + 288.43 \tag{2}.$$

2. The wavelength conversion element according to claim 1, wherein
   a proportion of a volume of the binder to a total volume of a sum of volumes of the phosphor particles and a sum of volumes of the binder is larger than 0 vol % and no larger than 10 vol %.

3. A light source device comprising:
   the wavelength conversion element according to claim 1; and
   a light source configured to emit excitation light to the wavelength conversion element.

4. A light source device comprising:
   the wavelength conversion element according to claim 2; and
   a light source configured to emit excitation light to the wavelength conversion element.

5. A method of manufacturing a wavelength conversion element, the method comprising:
   a preparation step of preparing a mixture obtained by mixing phosphor particles and a binder including glass with each other;

a coating step of applying the mixture on a holding member including alumina; and
a calcination step of calcining the mixture, wherein
a calcination temperature in the calcination step is 100° C. or more higher than a softening point of the glass,
the holding member is provided with a pore,
defining an apparent porosity of the holding member as X expressed in terms of %,
defining bending strength of the holding member as A expressed in terms of MPa, A fulfills a formula (3) below,
defining an elastic modulus of the holding member as B expressed in terms of GPa, B fulfills a formula (4) below, and
defining an elastic modulus of the glass as C expressed in terms of GPa,
defining a sum of a reciprocal of B and a reciprocal of C as D,
defining a product of a difference between a linear expansion coefficient of the holding member and a linear expansion coefficient of the glass and a transition point of the glass as Y,
a value of Y is smaller than a value of a product of A, D, and 0.001 when the linear expansion coefficient of the glass is smaller than the linear expansion coefficient of the holding member in a temperature range from the transition point of the glass to a room temperature $$A=-7.11X+316.52 \tag{3}$$

$$B=-6.26X+288.43 \tag{4}$$

6. A method of manufacturing a wavelength conversion element, the method comprising:
a preparation step of preparing a mixture obtained by mixing phosphor particles and a binder including glass with each other;
a coating step of applying the mixture on a holding member including alumina; and
a calcination step of calcining the mixture, wherein
viscosity of the glass in the calcination step is no higher than $10^6$ dPa·s,
the holding member is provided with a pore,
defining an apparent porosity of the holding member as X expressed in terms of %,
defining bending strength of the holding member as A expressed in terms of MPa, A fulfills a formula (5) below,
defining an elastic modulus of the holding member as B expressed in terms of GPa, B fulfills a formula (6) below, and
defining an elastic modulus of the glass as C expressed in terms of GPa,
defining a sum of a reciprocal of B and a reciprocal of C as D,
defining a product of a difference between a linear expansion coefficient of the holding member and a linear expansion coefficient of the glass and a transition point of the glass as Y,
a value of Y is smaller than a value of a product of A, D, and 0.001 when the linear expansion coefficient of the glass is smaller than the linear expansion coefficient of the holding member in a temperature range from the transition point of the glass to a room temperature $$A=-7.11X+316.52 \tag{5}$$

$$B=-6.26X+288.43 \tag{6}$$

7. A wavelength conversion element manufactured by the method of manufacturing the wavelength conversion element according to claim 5.

8. A wavelength conversion element manufactured by the method of manufacturing the wavelength conversion element according to claim 6.

9. A light source device comprising:
the wavelength conversion element according to claim 7; and
a light source configured to emit excitation light to the wavelength conversion element.

10. A light source device comprising:
the wavelength conversion element according to claim 8; and
a light source configured to emit excitation light to the wavelength conversion element.

11. A projector comprising:
the wavelength source device according to claim 3;
a light modulation device configured to modulate light emitted from the light source device in accordance with image information; and
a projection optical device configured to project the light modulated by the light modulation device.

12. A projector comprising:
the wavelength source device according to claim 4;
a light modulation device configured to modulate light emitted from the light source device in accordance with image information; and
a projection optical device configured to project the light modulated by the light modulation device.

13. A projector comprising:
the wavelength source device according to claim 9;
a light modulation device configured to modulate light emitted from the light source device in accordance with image information; and
a projection optical device configured to project the light modulated by the light modulation device.

14. A projector comprising:
the wavelength source device according to claim 10;
a light modulation device configured to modulate light emitted from the light source device in accordance with image information; and
a projection optical device configured to project the light modulated by the light modulation device.

* * * * *